US008144398B2

(12) United States Patent
Yoneda et al.

(10) Patent No.: US 8,144,398 B2
(45) Date of Patent: Mar. 27, 2012

(54) POLARIZING ELEMENT

(75) Inventors: Yoshitaka Yoneda, Tokyo (JP);
Michiyori Miura, Tokyo (JP); Toshiaki Sonehara, Tokyo (JP)

(73) Assignee: Hoya Candeo Optronics Corporation, Toda-shi (JP)

( * ) Notice: Subject to any disclaimer, the term of this patent is extended or adjusted under 35 U.S.C. 154(b) by 0 days.

(21) Appl. No.: 13/017,426

(22) Filed: Jan. 31, 2011

(65) Prior Publication Data
US 2011/0181953 A1 Jul. 28, 2011

Related U.S. Application Data

(63) Continuation of application No. PCT/JP2009/063701, filed on Jul. 31, 2009.

(51) Int. Cl.
*G02B 5/30* (2006.01)
(52) U.S. Cl. .................................. 359/487.06
(58) Field of Classification Search .................. None
See application file for complete search history.

(56) References Cited

U.S. PATENT DOCUMENTS

| | | | | |
|---|---|---|---|---|
| 3,954,485 A | * | 5/1976 | Seward et al. | 501/13 |
| 4,304,584 A | * | 12/1981 | Borrelli et al. | 65/30.11 |
| 5,943,156 A | * | 8/1999 | Komuro et al. | 359/280 |
| 6,313,947 B1 | * | 11/2001 | Takahashi et al. | 359/485.03 |
| 6,765,721 B2 | * | 7/2004 | Kawazu et al. | 359/487.06 |
| 6,777,359 B2 | | 8/2004 | Yamashita et al. | |
| 2007/0141350 A1 | * | 6/2007 | Borrelli et al. | 428/410 |
| 2009/0237787 A1 | | 9/2009 | Yoneda et al. | |
| 2010/0284074 A1 | | 11/2010 | Yoneda et al. | |
| 2011/0255161 A1 | | 10/2011 | Yoneda | |

FOREIGN PATENT DOCUMENTS

| | | |
|---|---|---|
| JP | 07-097235 | 4/1995 |
| JP | 08-040734 | 2/1996 |
| JP | 8-40734 | 2/1996 |
| JP | 09-086956 | 3/1997 |
| JP | 2009-217177 | 2/2009 |

* cited by examiner

*Primary Examiner* — Derek S Chapel
(74) *Attorney, Agent, or Firm* — Oblon, Spivak, McClelland, Maier & Neustadt, L.L.P.

(57) ABSTRACT

A polarizing element includes fine metal particles formed in numerous regions that were occupied by respective substantially needle-like metal halide fine particles before reduction that are oriented and dispersed in a glass substrate such that the lengthwise directions thereof are almost the same, the fine metal particles being produced by heat-treating the glass substrate in a reducing atmosphere to reduce the substantially needle-like metal halide fine particles. The number of fine metal particles present in at least some of the numerous regions is two or more in each region, 90% or more of the regions each have a volume of 2,500 to 2,500,000 $nm^3$, and the individual volumes of the fine metal particles present in each region are 4 to 40% of the volume of the region in 90% or more of the total number of the regions.

11 Claims, 15 Drawing Sheets

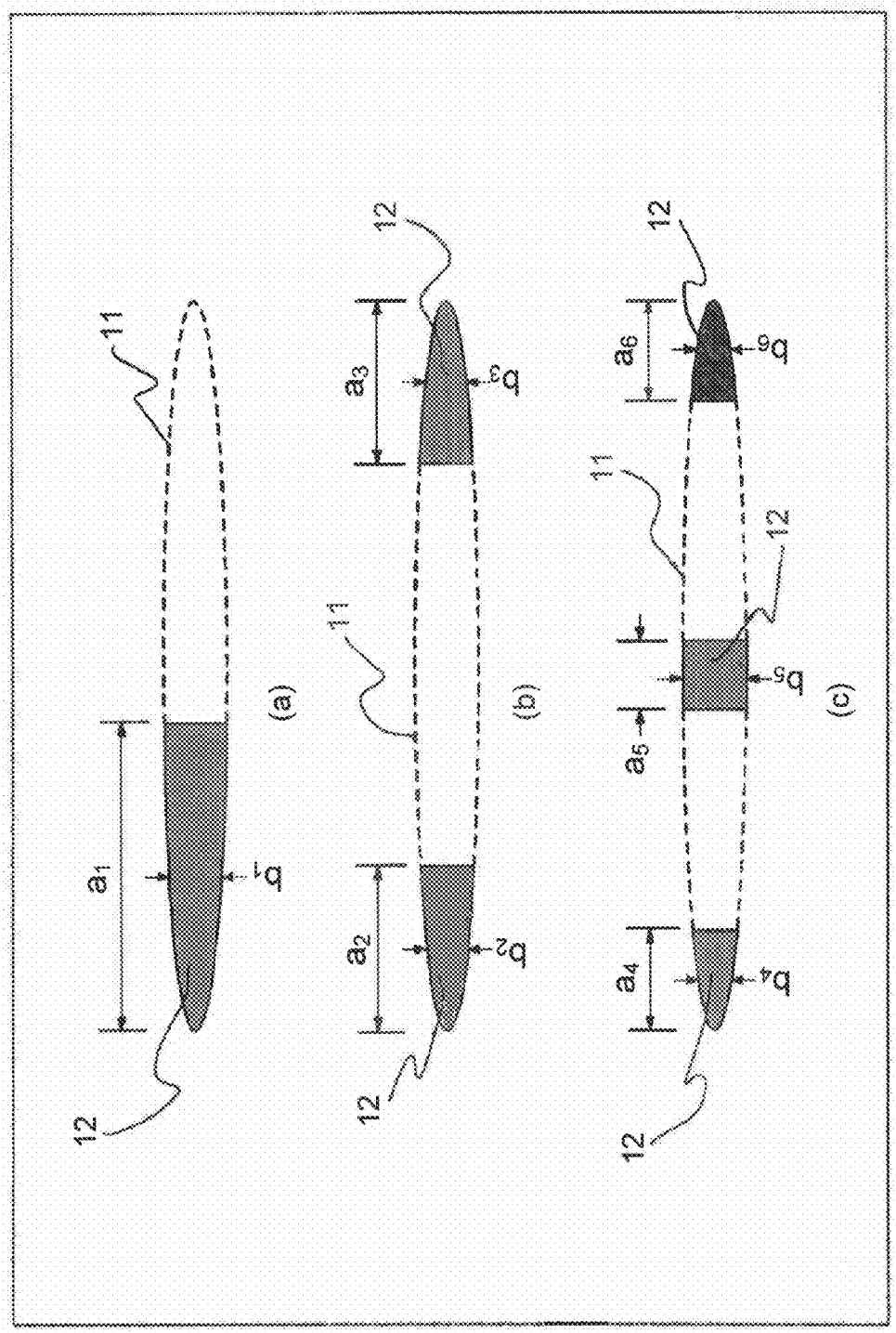

[FIG.2]
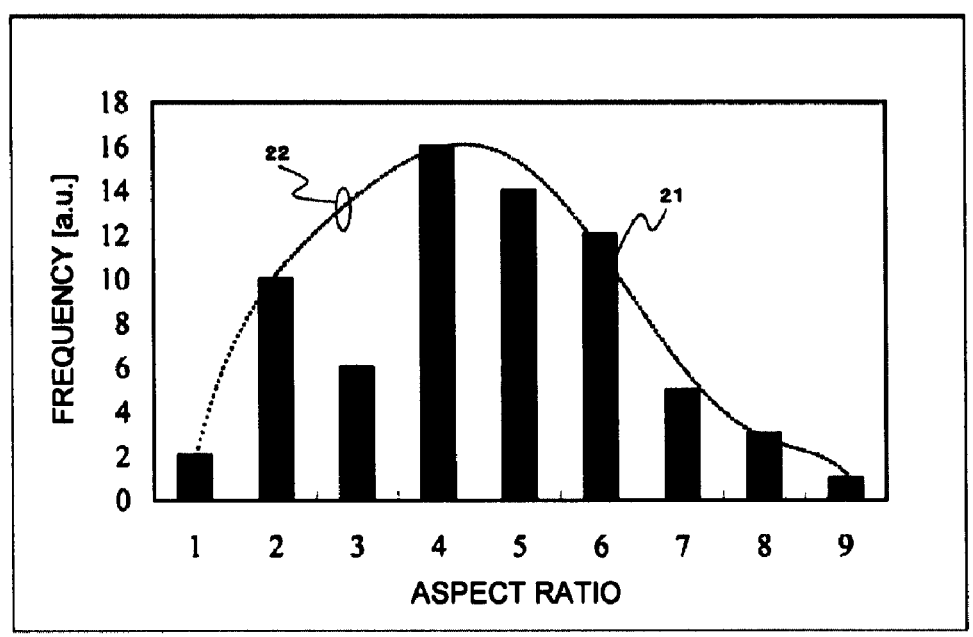

[FIG.3]
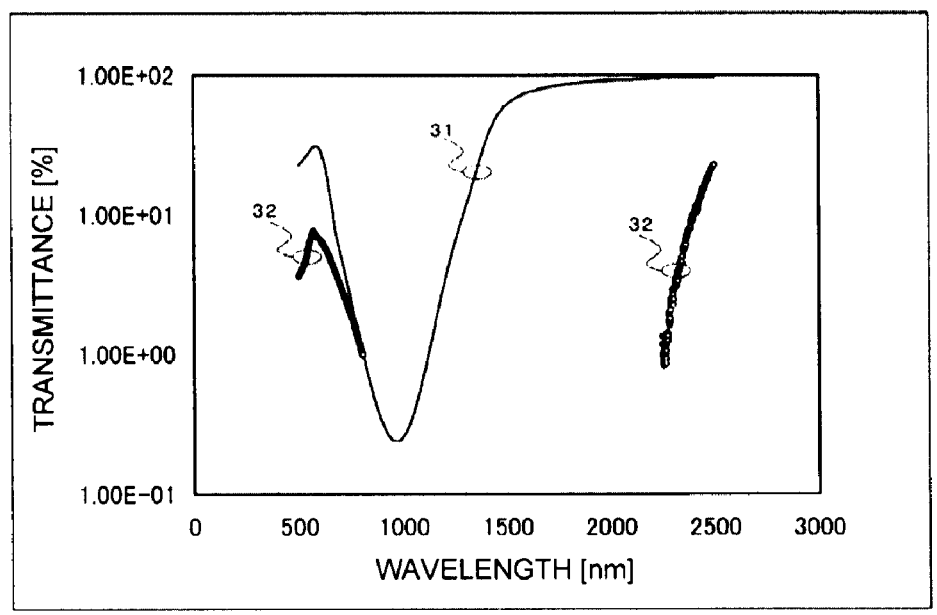

[FIG.4]
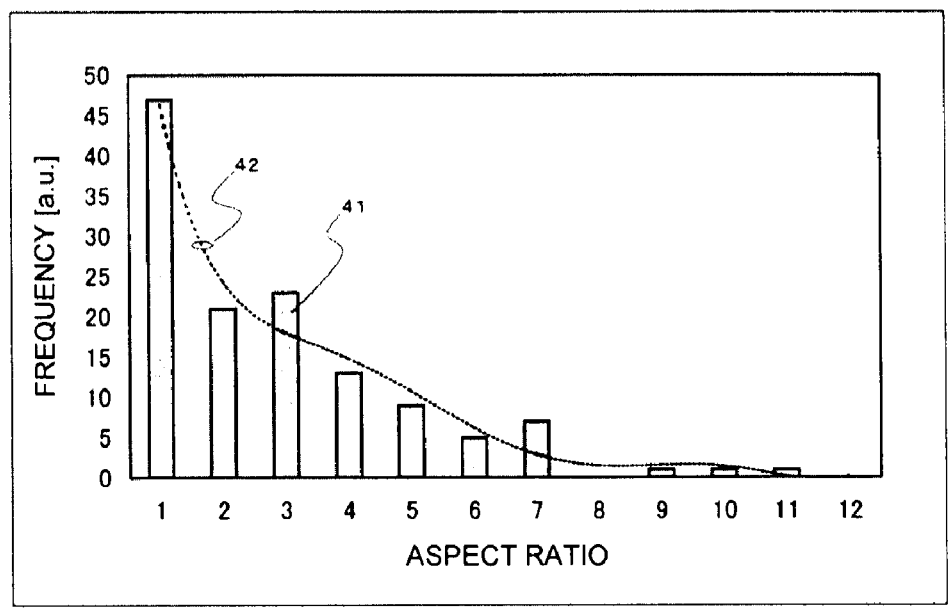

[FIG.5]
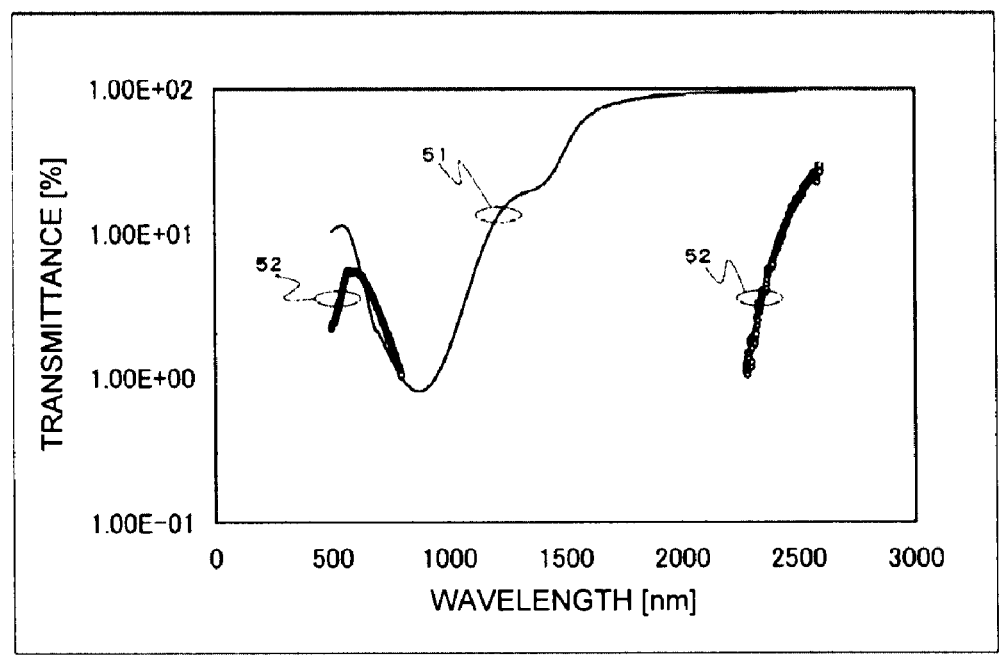

[FIG.6]
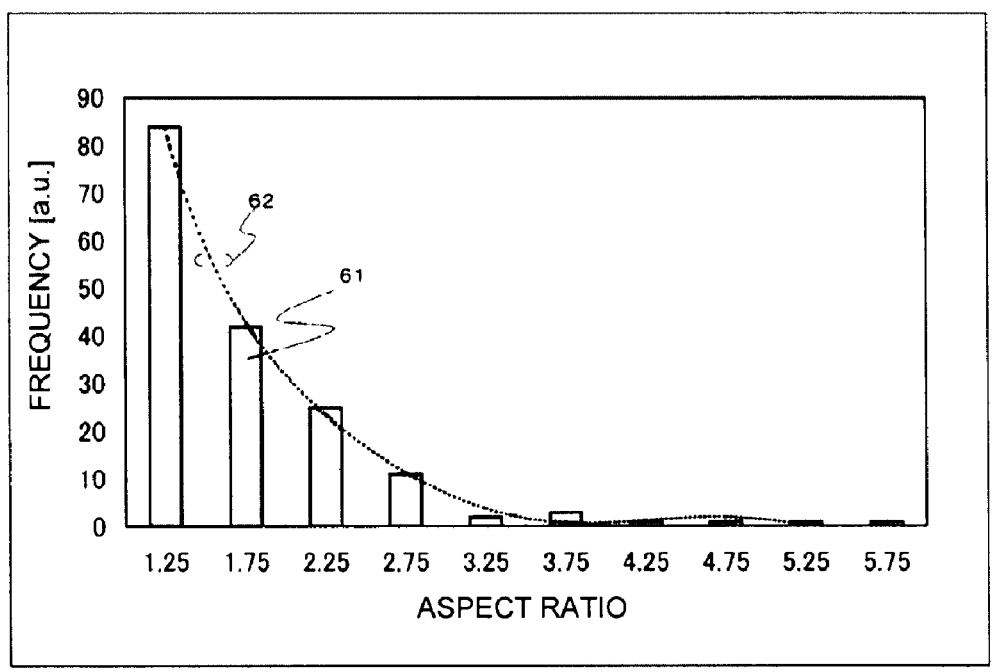

[FIG.7]
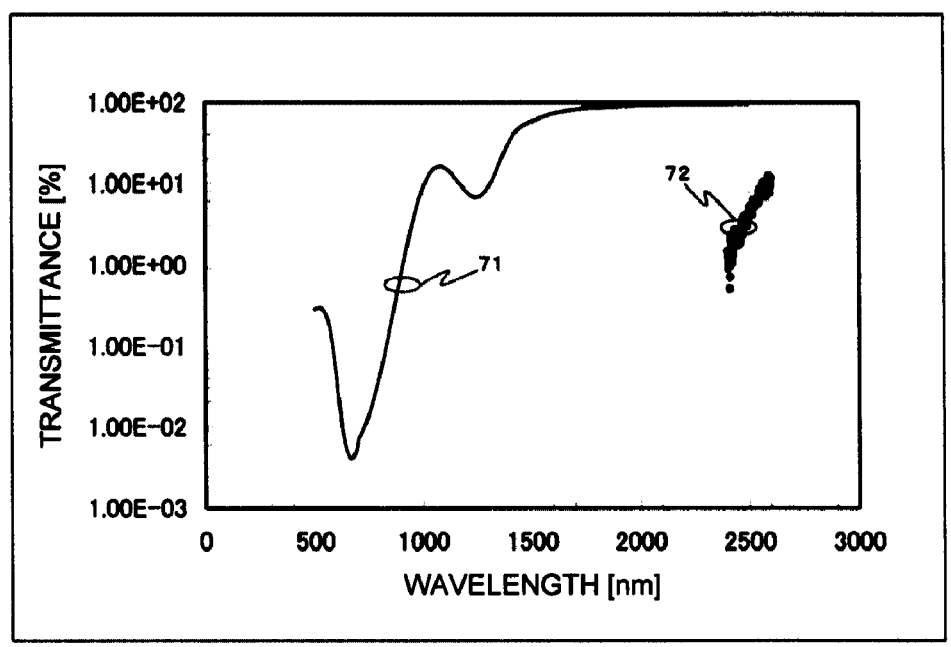

[FIG.8]
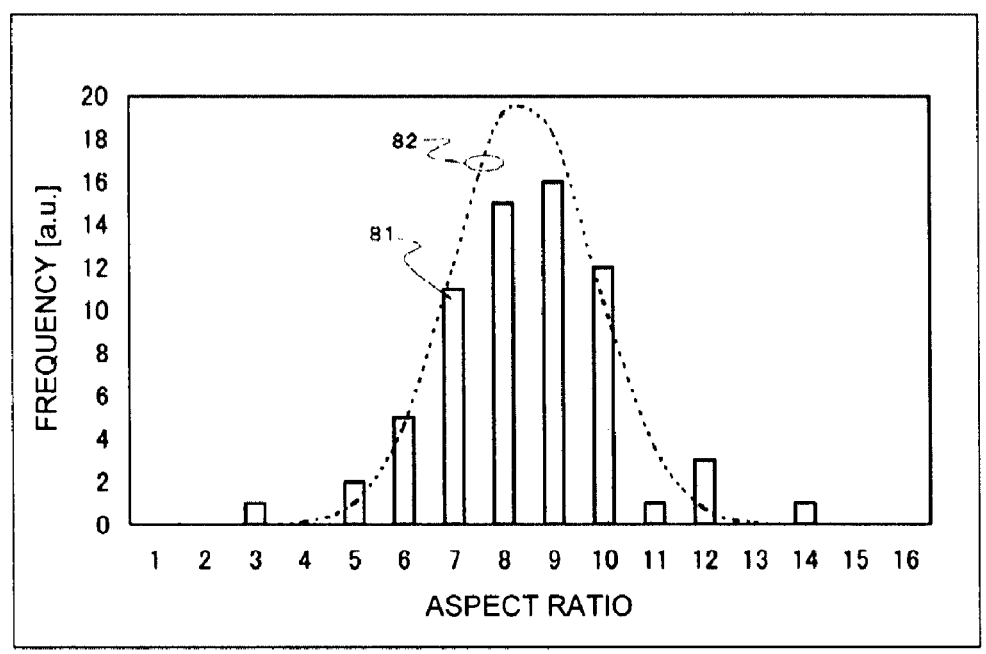

[FIG.9]
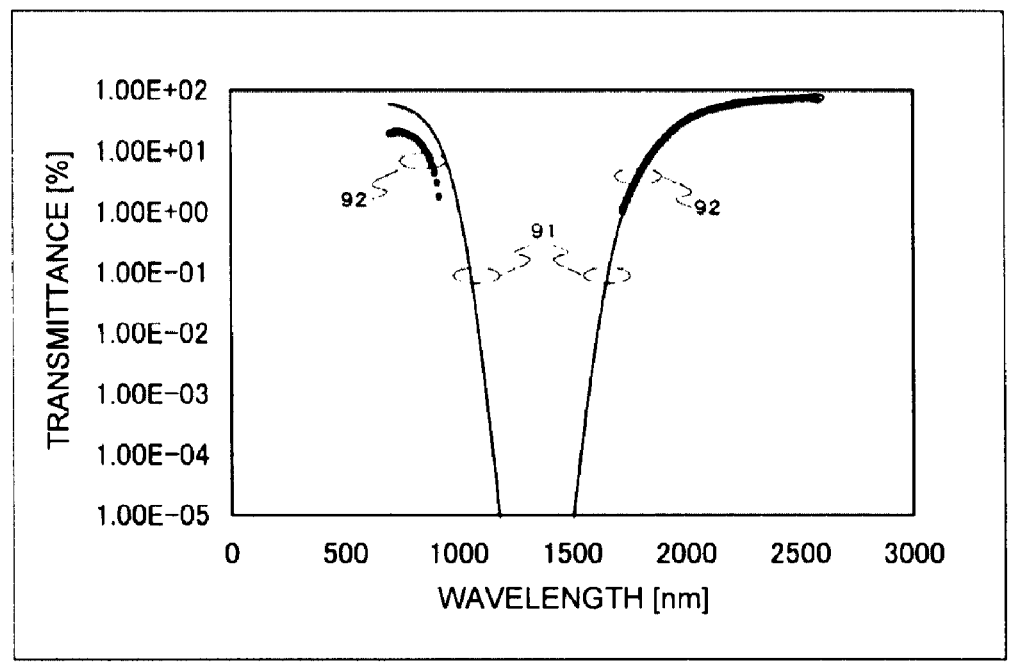

[FIG.10]
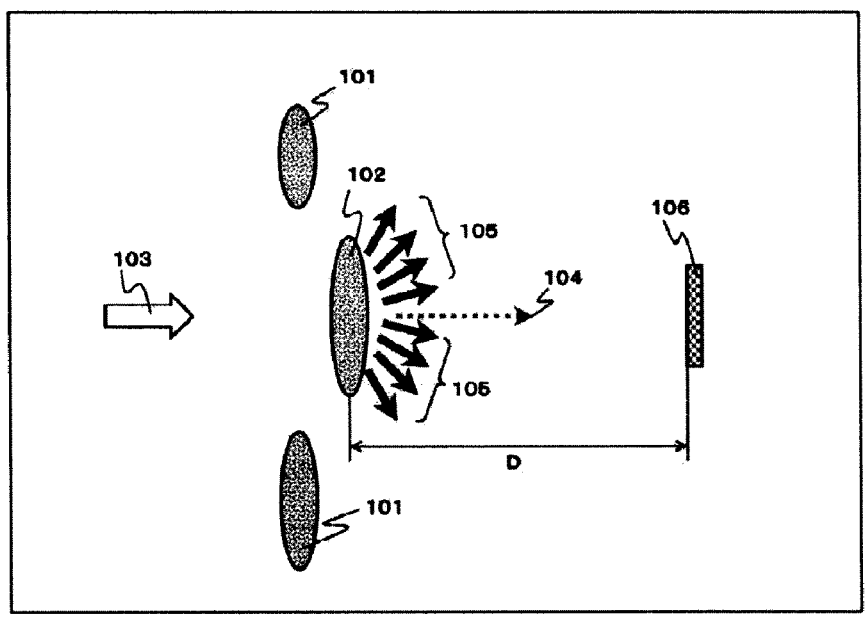

[FIG.11]
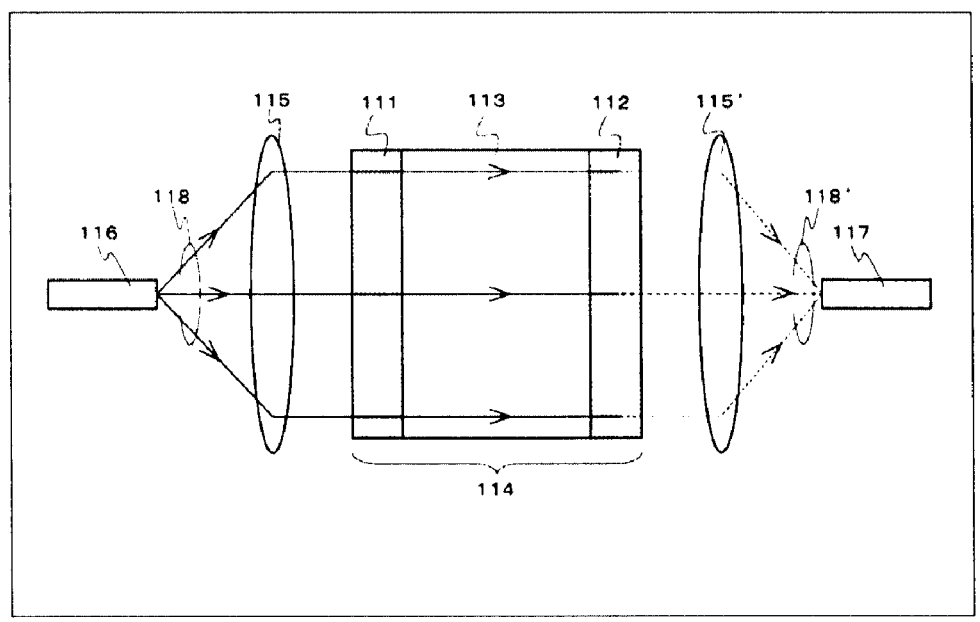

[FIG.12]
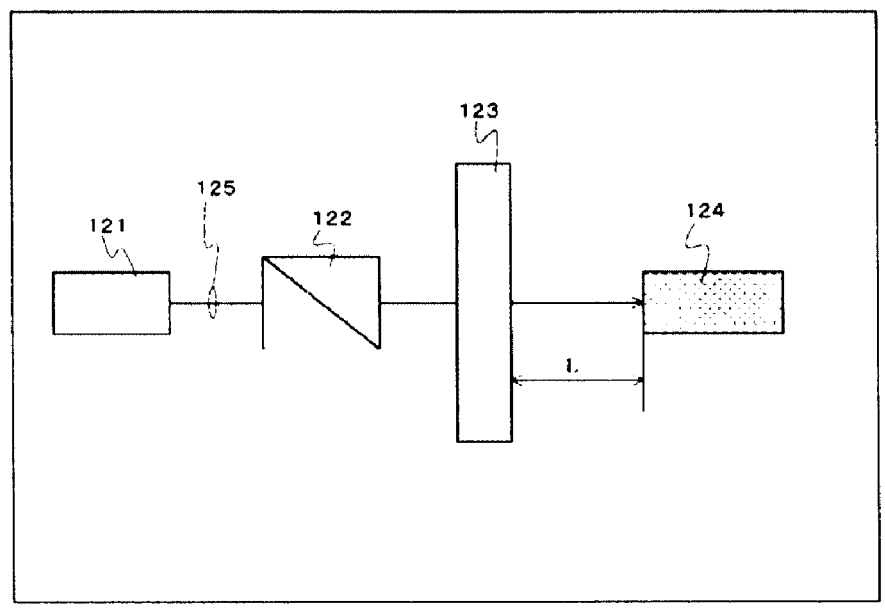

[FIG.13]
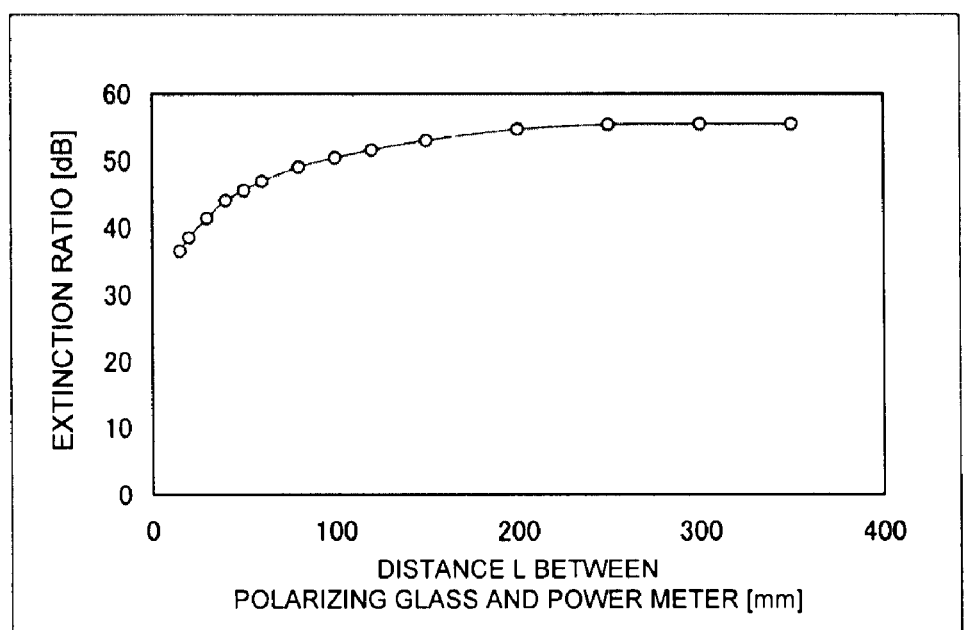

[FIG.14]
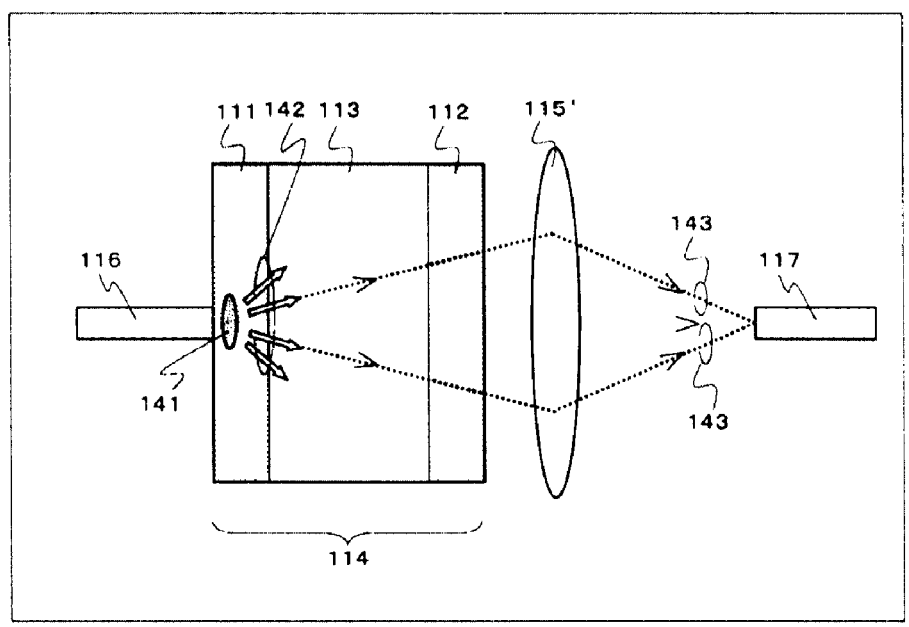

[FIG.15]
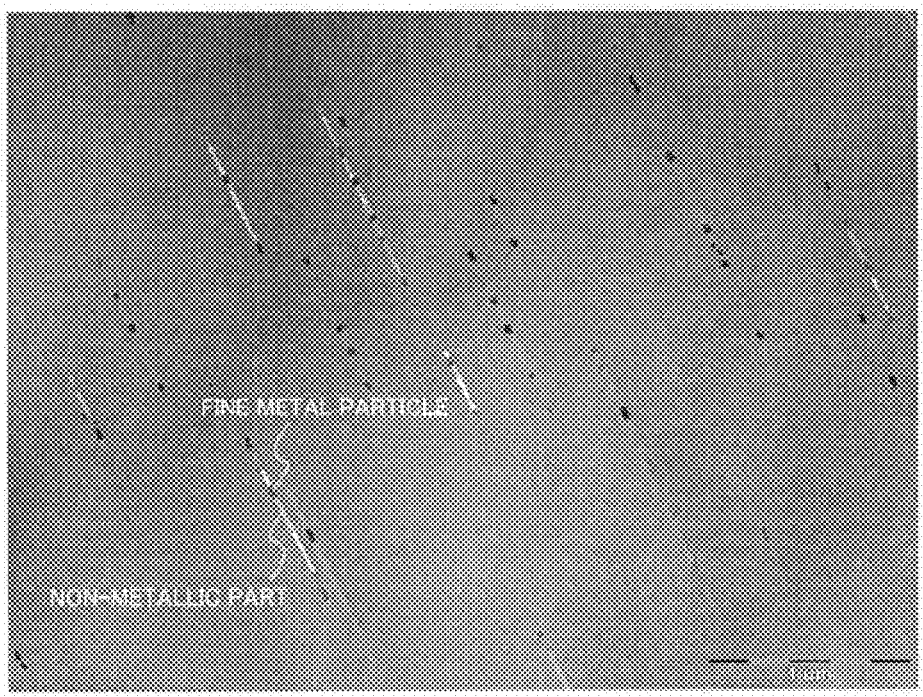

POLARIZING ELEMENT

CROSS REFERENCES TO RELATED APPLICATIONS

This application is a continuation of International Patent Application No. PCT/JP2009/63701, filed on Jul. 31, 2009, and claims priority to Japanese Patent Application No. 2008-198021, filed on Jul. 31, 2008, and Japanese Patent Application No. 2009-546608, filed on Jul. 31, 2009, all of which are incorporated herein by reference in their entireties.

BACKGROUND OF THE INVENTION

1. Field of the Invention

The present invention relates to optical isolators for use in optical communications fields in which semiconductor lasers and optical fibers are used, and in particular to polarizing glass constituting pigtail optical isolators.

2. Discussion of the Background

In optical communication in which a light source is realized by a semiconductor laser with a wavelength of 1.31 µm or 1.55 µm and a transmission line is realized by a silica-based fiber, an optical isolator is used to block feedback light, caused by reflection, traveling towards the light source to achieve a low error rate. The optical isolator typically includes a Faraday rotator, two polarizing elements, and a permanent magnet.

Polarizing glass including a glass substrate in which needle-like fine metal particles of silver or copper are dispersed such that the lengthwise directions thereof are oriented in a particular direction is generally used as the polarizing element for an optical isolator (hereinafter in this specification, this polarizing element is referred to as "polarizing glass containing dispersed fine metal particles"). The polarization effect in polarizing glass containing dispersed fine metal particles is attributable to the anisotropy of the plasmon resonance wavelength of the needle-like fine metal particles, and its polarizing characteristics are determined mainly by the aspect ratios of the needle-like fine metal particles (values obtained by dividing the lengthwise dimensions of the needle-like fine particles by the crosswise dimensions).

A method of manufacturing polarizing glass containing dispersed fine metal particles is described in detail in, for example, Japanese Unexamined Patent Application Publication No. 5-208844, and the manufacturing process is described briefly in the following.

<1> Glass materials including cuprous chloride are prepared with a desired composition, melted at a temperature of approximately 1450° C., and then cooled to room temperature.

<2> Thereafter, heat treatment is applied to cause precipitation of fine particles of cuprous chloride in the glass.

<3> After the fine particles of cuprous chloride are precipitated, a preform with an appropriate shape is produced by machining.

<4> The preform is stretched under predetermined conditions to obtain needle-like fine particles of cuprous chloride.

<5> Needle-like fine metal copper particles are obtained by reducing the stretched glass in a hydrogen atmosphere.

In polarizing glass containing dispersed fine metal particles that is manufactured by the above-described manufacturing process, the needle-like fine metal particles basically exist only in the vicinity of the surface layer of the glass, and the size of the region where they exist from the glass surface (hereinafter, the thickness from the surface is referred to as the "reduction layer thickness") depends on the reduction conditions, such as the ambient temperature, exposure time to the reducing atmosphere, and so forth.

So-called free-space optical isolators have been generally used as optical isolators for optical communication.

FIG. 11 is a schematic cross-sectional side view of the optical system of a free-space optical isolator. In the figure, reference numerals 111 and 112 denote polarizing elements; reference numeral 113 denotes a Faraday rotator; reference numeral 114 denotes an optical isolator composed of the polarizing elements 111 and 112 and the Faraday rotator 113; reference numerals 115 and 115' denote lenses; reference numeral 116 denotes an optical fiber; reference numeral 117 denotes a light source such as a semiconductor laser; and reference numerals 118 and 118' denote a set of lines schematically showing beams of feedback light returning to the light source 117 (in particular, reference numeral 118' denotes beams that have passed through the polarizing element 112). In the optical isolator 114 shown in FIG. 11, the polarization transmission axes of the polarizing elements 111 and 112 are arranged so as to form an angle of 45° relative to each other. Furthermore, regarding the Faraday rotator 113, its optical path length is set such that the polarization rotation angle is 45°. With the above-described arrangement, the beam (not shown in the figure) emitted from the light source 117 is converted into a collimated beam by the lens 115', and only the light with polarization parallel to the polarization transmission axis of the polarizing element 112 is incident upon the Faraday rotator 113. The polarization direction of the light incident upon the Faraday rotator 113 is rotated by 45° through the Faraday effect of a permanent magnet (not shown in the figure). As described above, because the polarization transmission axes of the polarizing elements 111 and 112 make an angle of 45° relative to each other, the polarization direction of the light that has passed through the Faraday rotator 113 coincides with the polarization transmission axis of the polarizing element 111. Therefore, the light that has passed through the Faraday rotator 113 passes through the polarizing element 111 almost without loss, is converged by the lens 115, and then enters the optical fiber 116.

On the other hand, the feedback light beam 118 returning to the light source as a result of reflection at the optical fiber 116 or, for example, an optical element disposed downstream thereof (not shown in the figure) returns to the light source 117 in the opposite direction via the same optical path as that of the beam emitted from the above-described light source 117. In this case, because the polarization direction of the feedback light beam 118 that has passed through the Faraday rotator 113 forms an angle of 90° relative to the polarization transmission axis of the polarizing glass 112 (hereinafter, the axis differing by 90° relative to the polarization transmission axis is referred to as the "polarization extinction axis") due to the irreciprocity of the Faraday rotator 113, its optical energy is greatly lost as it passes through the polarizing element 112.

In general, the performance of an optical isolator is evaluated based on the transmission loss of the light emitted from the light source and the isolation, which is the ability to block the feedback light 118. In particular, isolation is given by Expression (1) below, typically in units of decibels.

[Expression 1]

$$ISO(dB) = -10 \times \log\left(\frac{P_{ss'}}{P_{ss}}\right) \quad (1)$$

Here, ISO represents isolation, $P_{88'}$ represents the power of the feedback light beam 118', and $P_{88}$ represents the power of the feedback light beam 118.

Isolation depends on the characteristics of the polarizing elements 111 and 112, variations of the rotation angle in the polarization direction in the Faraday rotator 113, and so forth. When the above-described known polarizing glass containing dispersed fine metal particles, in which needle-like fine particles of silver or copper are oriented and dispersed, is used as the polarizing elements 111 and 112, the isolation value is 30 dB or more, which is a level causing substantially no problems for practical use.

Nowadays, there is a demand for compact optical components, which has caused pigtail optical isolators to be commonly used. FIG. 14 is a schematic cross-sectional side view of the optical system of a pigtail optical isolator. In this drawing, reference numeral 141 denotes a needle-like fine metal particle included in the polarizing element 111; reference numeral 142 denotes arrows schematically showing the propagation directions of scattered light; and reference numeral 143 denotes an optical path of the feedback light beam.

The optical system of the pigtail optical isolator differs from the optical system of the free-space optical isolator shown in FIG. 11 in that (1) the optical fiber 116 is coupled directly to the polarizing element 111, and (2) only a single lens is provided. As a result, the optical path of the feedback light beam 143 differs from that of the feedback light beam 118, whereas the structures of the optical isolators 114 are almost same.

However, pigtail isolators have been problematic in that, when employing known polarizing glass containing dispersed fine metal particles in which needle-like fine particles of silver or copper are oriented and dispersed, in other words, polarizing glass that exhibits an isolation value of 30 dB or more when applied to a free-space optical isolator, the isolation value decreases to 23 to 27 dB, which is lower than the required specification of 30 dB.

As a result of intensive efforts to seek the cause of this problem, the inventors of the present invention have determined that the relevant cause lies in the fact that a pigtail optical isolator is more easily affected by scattered light in polarizing glass containing dispersed fine metal particles than a free-space optical isolator due to the difference in the optical systems of free-space optical isolators and pigtail optical isolators, revealing that it is necessary to decrease this scattered light to achieve the desired isolation level in a pigtail optical isolator.

Decreasing the volume of fine metal particles included in polarizing glass containing dispersed fine metal particles is effective to decrease scattered light, which will be described later in detail.

It should be noted, however, that the volumes of fine metal particles need to be decreased while maintaining certain aspect ratios because the polarizing characteristics of polarizing glass containing dispersed fine metal particles are determined by the aspect ratio of the substantially needle-like fine metal particles included in the glass.

For this purpose, metal halide fine particles with small volumes are precipitated in a glass substrate and then need to be stretched more intensely in the lengthwise direction in the subsequent stretching process to maintain their aspect ratios.

Not only are extensive facilities required in order to more intensely stretch the metal halide fine particles in the stretching process, but also glass is more likely to break in the stretching process, thereby decreasing the yield. Thus, this method cannot be considered a suitable manufacturing method.

SUMMARY OF THE INVENTION

In short, an object of the present invention is to provide a structure of polarizing glass containing dispersed fine metal particles that features decreased intensity of scattered light compared with known polarizing glass containing dispersed fine metal particles and that can also achieve an isolation level of 30 dB or more even when applied to a pigtail optical isolator.

Scattered light in polarizing glass containing dispersed fine metal particles will be described in detail below.

According to a first aspect of the present invention, there is provided a polarizing element including fine metal particles formed in numerous regions that were occupied by respective substantially needle-like metal halide fine particles before reduction that are oriented and dispersed in a glass substrate such that the lengthwise directions thereof are almost the same, the fine metal particles being produced by heat-treating the glass substrate in a reducing atmosphere to reduce the substantially needle-like metal halide fine particles, wherein the number of fine metal particles present in at least some of the numerous regions is two or more in each region, each of the numerous regions has a volume of 2,500 to 2,500,000 nm$^3$ in 90% or more of the total number of the regions, and the individual volumes of the fine metal particles present in each region are 4 to 40% of the volume of the region in 90% or more of the total number of the regions.

In the polarizing element according to the first aspect of the present invention, the number of fine metal particles in at least some of the regions may be three or more.

In the polarizing element according to the first aspect of the present invention, the number of fine metal particles in 20% or more of the regions may be three or more.

In the polarizing element according to the first aspect of the present invention, the individual volumes of the fine metal particles may be 100,000 nm$^3$ or less in 90% or more of the total number of the fine metal particles produced by the reduction.

In the polarizing element according to the first aspect of the present invention, the fine metal particles may include a fine metal particle with an aspect ratio of less than 2, the aspect ratio being defined by dividing the size of the fine metal particle in a direction parallel to the lengthwise directions of the metal halide fine particles by the size of the fine metal particle in a direction parallel to the minor axes of the metal halide fine particles.

In the polarizing element according to the first aspect of the present invention, the fine metal particles may include a fine metal particle with an aspect ratio of 9 or less in 90% or more of the total number of the fine metal particles produced by the reduction, the aspect ratio being defined by dividing the size of the fine metal particle in a direction parallel to the lengthwise directions of the metal halide fine particles by the size of the fine metal particle in a direction parallel to the minor axes of the metal halide fine particles.

In the polarizing element according to the first aspect of the present invention, a near-field extinction ratio at a measurement distance L of 15 mm may be 42 dB or more.

According to a second aspect of the present invention, there is provided a polarizing element including fine metal particles formed in numerous regions that were occupied by respective substantially needle-like metal halide fine particles before reduction that are oriented and dispersed in a glass substrate such that the lengthwise directions thereof are almost the same, the fine metal particles being produced by heat-treating the glass substrate in a reducing atmosphere to reduce the substantially needle-like metal halide fine particles, wherein the number of fine metal particles present in at least some of the numerous regions is two or more in each region, each of the numerous regions has a volume of 2,500 to 2,500,000 nm$^3$ in 90% or more of the total number of the regions, the individual volumes of the fine metal particles present in each region are 4 to 40% of the volume of the region in 90% or more of the total number of the regions, and the shape of a transmittance spectrum of the polarizing element for a linearly polarized wave having an electric-field oscillation direction in a direction substantially parallel to the lengthwise directions of the metal halide fine particles is enlarged towards a long-wavelength side, relative to the shape of a transmittance spectrum theoretically obtained from an aspect ratio distribution of fine metal particles produced by reducing the metal halide fine particles, each of the aspect ratios being defined by dividing the size of the corresponding fine metal particle in a direction parallel to the lengthwise directions of the metal halide fine particles by the size of the corresponding fine metal particle in a direction parallel to the minor axes of the metal halide fine particles.

In the polarizing element according to the second aspect of the present invention, a wavelength bandwidth exhibiting a transmittance of about 1% in a transmittance spectrum of the polarizing element for a linearly polarized wave having an electric-field oscillation direction in a direction substantially parallel to the lengthwise directions of the metal halide fine particles may be wider than a wavelength bandwidth exhibiting a transmittance of about 1% in a transmittance spectrum theoretically obtained from an aspect ratio distribution of fine metal particles.

In the polarizing element according to the second aspect of the present invention, in a transmittance spectrum of the polarizing element for a linearly polarized wave having an electric-field oscillation direction in a direction substantially parallel to the lengthwise directions of the metal halide fine particles, the transmittance may be about 50% or less at least in a band including light wavelengths of 400 nm to 2500 nm.

In the polarizing element according to the second aspect of the present invention, the metal halide fine particles may be silver halide or copper halide.

According to the present invention, a structure of a polarizing glass that can achieve an isolation level of 30 dB or more in a pigtail optical isolator, as in a free-space optical isolator, is provided.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIGS. 1(a), 1(b), and 1(c) are schematic diagrams showing production types of needle-like fine metal particles in polarizing glass containing dispersed fine metal particles.

FIG. 2 is an aspect ratio distribution of needle-like fine copper particles.

FIG. 3 shows an actually measured transmission spectrum and a calculated transmission spectrum.

FIG. 4 is an aspect ratio distribution of needle-like fine copper particles.

FIG. 5 shows an actually measured transmission spectrum and a calculated transmission spectrum.

FIG. 6 is an aspect ratio distribution of needle-like fine copper particles.

FIG. 7 shows an actually measured transmission spectrum and a calculated transmission spectrum.

FIG. 8 is an aspect ratio distribution of needle-like fine copper particles.

FIG. 9 shows an actually measured transmission spectrum and a calculated transmission spectrum.

FIG. 10 is a diagram depicting the interaction between light and needle-like fine metal particles oriented and dispersed in polarizing glass containing dispersed fine metal particles.

FIG. 11 is a schematic cross-sectional side view of the optical system of a free-space optical isolator.

FIG. 12 is a schematic diagram illustrating a system for measuring transmission loss and extinction ratio of polarizing glass containing dispersed fine metal particles.

FIG. 13 shows one example of how the extinction ratio of known polarizing glass containing dispersed fine metal particles depends on distance L.

FIG. 14 is a schematic cross-sectional side view of the optical system of a pigtail optical isolator.

FIG. 15 shows an image of polarizing glass containing dispersed fine metal particles produced according to the present invention, as obtained with a transmission electron microscope.

DETAILED DESCRIPTION OF THE PREFERRED EMBODIMENTS

Extinction characteristics and scattered light of polarizing glass containing dispersed fine metal particles according to the present invention will now be described in detail.

In general, polarizing elements refer to elements that have a function for transmitting linearly polarized waves having electric-field oscillation planes in a particular direction (in this specification, the relevant particular direction is referred to as the "polarization transmission axis") and blocking linearly polarized waves having electric-field oscillation planes in a direction orthogonal to the polarization transmission axis (in this specification, the direction orthogonal to the polarization transmission axis is referred to as the "polarization extinction axis"). Transmission loss refers to loss that is experienced by a linearly polarized wave having an electric-field oscillation plane in a direction parallel to the polarization transmission axis of a polarizing element when the wave passes through the polarizing element. Further, extinction ratio refers to the value resulting from multiplying by ten the logarithm of the value obtained by dividing the power of transmitted light measured when a linearly polarized wave having an electric-field oscillation plane in a direction parallel to the polarization transmission axis is incident (Pt) by the power of transmitted light measured when a linearly polarized wave having an electric-field oscillation plane in a direction parallel to the polarization extinction axis is incident (Pe) (Expression (2)).

[Expression 2]

$$ExtinctionRatio(\text{dB}) = 10 \cdot \log\left[\frac{Pt}{Pe}\right] \quad (2)$$

It is known that when a linearly polarized wave is emitted onto fine metal particles dispersed in a glass base material, absorption of the light by a fine metal particle is given by Expression (3) below (refer to, for example, T. P. Seward, III, J. Non-Cryst. Solid, 40 (1980) 499-513).

[Expression 3]

$$Cabs = \frac{2\pi \cdot V \cdot n_0^3}{L^2 \cdot \lambda} \frac{\varepsilon''}{\left\{\varepsilon' + n_0^2\left(\frac{1}{L} - 1\right)\right\}^2 + \varepsilon''^2} \quad (3)$$

Here, Cabs represents the light absorption cross-sectional area; V represents the volume of the needle-like fine metal particle; $n_0$ represents the refractive index of the glass base material; $\lambda$ represents the vacuum wavelength of the irradiation light; $\varepsilon'$ represents the real part of the dielectric constant of metal constituting the needle-like fine particle; $\varepsilon''$ represents the imaginary part of the same dielectric constant; and L represents a shape factor determined by the shape of the needle-like fine metal particle.

For a needle-like fine metal particle, the shape factor L varies depending on the direction thereof. For example, if the shape is approximated by a spheroid or cylinder, L in the lengthwise direction becomes smaller than L in the crosswise direction. As a result, the value of the complex dielectric constant that gives the maximum absorption cross-sectional area Cabs differs depending on the direction, and also, the complex dielectric constant differs depending on the light wavelength. Therefore, the light wavelength that gives the maximum absorption cross-sectional area Cabs differs depending on the direction (in this specification, the light wavelength that gives the maximum absorption cross-sectional area Cabs in Expression (3) is referred to as the "plasmon resonance wavelength").

In short, in polarizing glass containing dispersed fine metal particles, the shape factor L is usually determined so that the absorption cross-sectional area Cabs of each needle-like fine metal particle in the lengthwise direction is maximized at the desired light wavelength, and the aspect ratio of the needle-like fine metal particle is controlled so as to achieve such a shape factor L. For example, if silver is used as fine metal particles, the light wavelength is 1.55 μM, and the refractive index of the glass base material is 1.5, then the value of L is up to 0.018, and furthermore, the aspect ratio, obtained by dividing the major-axis diameter of each needle-like fine metal particle by the minor-axis diameter, is up to 11.

With the above-described structure, when a linearly polarized wave having the desired wavelength is emitted into the relevant polarizing glass such that the plane of polarization is parallel to the lengthwise directions of needle-like fine metal particles, resonance absorption (so-called plasmon resonance absorption) of the fine metal particles occurs, thereby blocking transmission of the light. In short, the polarization extinction axis coincides with the lengthwise directions of the needle-like fine metal particles.

On the other hand, when a linearly polarized wave that is polarized in a direction orthogonal to the lengthwise directions of the needle-like fine metal particles is emitted, no resonance absorption occurs, thus allowing the irradiation light to pass through the relevant polarizing glass almost without loss.

In this manner, plasmon resonance absorption by fine metal particles is strongly associated with the polarization effect of polarizing glass containing dispersed fine metal particles that are oriented and dispersed such that their lengthwise directions coincide with a particular direction, which is the reason why the relevant polarizing glass is referred to as an "absorptive polarizing element".

The optical characteristics of polarizing elements including, but not limited to, polarizing glass containing dispersed fine metal particles are evaluated based on their transmission loss and extinction ratio. In other words, superior polarizing elements refer to those having high extinction ratios and low transmission loss, and for polarizing glass containing dispersed fine metal particles, both characteristics depend on the aspect ratio distribution of the needle-like fine metal particles and the total number of needle-like fine metal particles.

For example, if polarizing glass containing dispersed fine metal particles is manufactured by producing needle-like metal silver or metal copper by reducing, in a reducing atmosphere, needle-like silver halide or copper halide that is uniformly dispersed in a glass base material such that its lengthwise direction coincides with a particular direction, then the transmission loss and the extinction ratio of the polarizing glass are determined by the aspect ratio distribution of the needle-like fine metal particles and the reduction layer thickness.

The transmission loss and extinction ratio of polarizing glass containing dispersed fine metal particles will now be described.

FIG. 12 is a schematic diagram showing a system for measuring the transmission loss and extinction ratio of polarizing glass containing dispersed fine metal particles. In the figure, reference numeral 121 denotes a laser light source; reference numeral 122 denotes a Glan-Thompson prism; reference numeral 123 denotes polarizing glass containing dispersed fine metal particles; reference numeral 124 denotes a power meter; reference numeral 125 denotes a ray emitted from the light source; and reference symbol L denotes the distance between the polarizing glass and the sensor of the power meter. The Glan-Thompson prism 122 is provided to obtain a linearly polarized wave in a particular direction.

The extinction ratio of the polarizing glass containing dispersed fine metal particles increases as the reduction layer thickness increases and saturates normally at a reduction layer thickness of about 30 to 40 μm. For polarizing glass containing dispersed fine metal particles, reduction layers are formed on both side surfaces of the relevant polarizing glass with almost the same thickness due to the nature of its manufacturing method. With this being taken into consideration, the "reduction layer thickness" as used in this specification refers to the thickness of the reduction layer formed on one side surface (thus, "30 to 40 μm" in the above-described expression "at a reduction layer thickness of about 30 to 40 μm" refers to the thickness of the reduction layer formed on one side surface).

The extinction characteristics of polarizing glass containing dispersed fine metal particles, which have been clarified through a systematic review by the inventors of the present invention, as well as the influence of scattered light upon the extinction characteristics, will now be described in detail.

FIG. 13 shows one example illustrating how the extinction ratio of known polarizing glass containing dispersed fine metal particles depends on distance L (for distance L, refer to FIG. 12). In this example, the needle-like fine metal particles included in the polarizing glass containing dispersed fine metal particles are copper, and the reduction layer thickness is up to 30 μm. In the figure, extinction ratio measurements are indicated with circles, and all measurements are connected by lines to draw a curve. The wavelength of the laser beam used for this measurement was 1.55 μm, and the beam diameter was about 1 mm. Within the range of the measurement distance L shown in the figure, the diameter of the laser beam emitted from the light source 121, shown in FIG. 12, was constant.

As shown in FIG. 13, in a region in which the distance L is as long as 200 mm or more (hereinafter, referred to as the "far region"), the extinction ratio of polarizing glass containing dispersed fine metal particles exhibits a constant value of up to 55 dB, independently of distance L. In a region in which the distance L is as short as 100 mm or less (hereinafter, referred to as the "near region"), the extinction ratio decreases inversely with almost the square of the distance L. This kind of dependency of the extinction ratio upon distance is well known but cannot be explained based on Expression (3), which is used as design guidelines for polarizing glass containing dispersed fine metal particles.

The above-described dependency of the extinction ratio upon distance can be given a qualitative interpretation as follows.

FIG. 10 schematically shows the interaction between light and needle-like fine metal particles that are oriented and dispersed in polarizing glass containing dispersed fine metal particles. In the figure, reference numerals 101 and 102 denote needle-like fine metal particles oriented and dispersed in polarizing glass containing dispersed fine metal particles; reference numeral 103 denotes incident light; reference numeral 104 denotes a transmitted light component; reference numeral 105 denotes scattered light components; reference numeral 106 denotes a sensor section of the power meter; and reference symbol D denotes the distance between the needle-like fine metal particle 102 and the sensor section 106.

In the figure, it is assumed that the incident light 103 is a linearly polarized wave, with its electric-field oscillation direction being parallel to the lengthwise directions of the needle-like fine metal particles 101 and 102, and furthermore, that the aspect ratio of the needle-like fine metal particle 102 is set such that the plasmon resonance wavelength of the needle-like fine metal particle 102 substantially coincides with the wavelength of the incident light 103. With the above-described structure, for the light incident upon the needle-like fine metal particle 102, the power of the transmitted light 104 dramatically decreases compared with the power of the light incident upon the needle-like fine metal particle 102 due to resonance absorption by the relevant fine metal particle (the light incident upon the needle-like fine metal particle 102 is part of the incident light 103).

On the other hand, part of the light that has been resonantly absorbed into the needle-like fine metal particle 102 is converted into thermal energy, and its residue is used to induce electronic polarization of free electrons in the needle-like fine metal particle 102. The relevant electronic polarization is polarization that oscillates at the same frequency as that of the incident light 103, resulting in emission of light with the same wavelength as that of the incident light 103. The scattered light 105 originates from this radiated light. The propagation direction of the scattered light 105 is not always parallel to the propagation direction of the incident light 103. For example, the intensity of the scattered light 105 is cylindrically symmetric with respect to the longitudinal axis of the needle-like fine metal particle 102.

In short, because the intensity distribution of the scattered light 103 is substantially spatially isotropic when viewed from the sensor section 106 of the power meter, the power of scattered light detected by the sensor section 106 decreases inversely with almost the square of distance D. In contrast, because the transmitted light component 104 keeps the same propagation direction as that of the incident light 103, constant power is maintained independently of distance D.

As a result of the above descriptions, it can be concluded that what determines the extinction ratios measured in the near region is the power of the scattered light 105, whereas what determines the extinction ratios measured in the far region are the power of the transmitted light component 104 that propagates in the same direction as that of the incident light 103 and the power of the light components through the polarizing glass containing dispersed fine metal particles; i.e., those light components that have passed through the gap between the needle-like fine metal particles 101 and 102 and have not interacted with any needle-like fine metal particles in the polarizing glass containing dispersed fine metal particles. In short, it can be said that extinction ratios measured in the far region reflect the absorption characteristics of the needle-like fine metal particles, whereas extinction ratios measured in the near region reflect the scattering characteristics of the needle-like fine metal particles.

As a result of intensive efforts to systematically study the relationship between the morphology of needle-like fine metal particles and the extinction ratio or light transmission spectrum for polarizing glass containing dispersed fine metal particles that is produced by reducing stretched metal halide fine particles, the inventors of the present invention have found that light absorption characteristics in a particular morphology cannot be explained by the use of Expression (3) and have achieved the present invention based on such findings.

Step-by-step descriptions will follow, starting with the relationship between the morphology of needle-like fine metal particles and light transmission characteristics of polarizing glass containing dispersed fine metal particles.

When N fine metal particles having a single shape are irradiated with light with a wavelength $\lambda$, the power $S(\lambda)$ of the transmitted light is given from the expression below, based on Expression (3).

[Expression 4]

$$S(\lambda) \propto \exp(-N \cdot C_{abs}(\lambda)) \tag{4}$$

In addition, if it is assumed that the volumes of fine metal particles are constant and only their shape factors are distributed, then transmitted light power $S(\lambda)$ can be obtained by substituting $C_{abs}^{total}(\lambda)$ in the expression below for absorption cross-sectional area $C_{abs}(\lambda)$ in Expression (4).

[Expression 5]

$$C_{abs}^{total}(\lambda) = N \sum_{S.F.} \Omega(S.F.) \cdot C_{abs}(\lambda) \tag{5}$$

Here, S.F. stands for shape factor, and $\Omega(S.F.)$ is a distribution function of the shape factors.

As described above, for polarizing glass containing dispersed fine metal particles, shape factor L is usually determined so as to maximize absorption cross-sectional area $C_{abs}(\lambda)$ in the lengthwise directions of the needle-like fine metal particles at the desired light wavelength, and the aspect ratios of the needle-like fine particles are controlled to produce such a shape factor L. For example, if silver is used as fine metal particles, the light wavelength is 1.55 µm, and the refractive index of the glass base material is 1.5, then the value of L is up to 0.018, and the aspect ratio is up to 11, as described above. Furthermore, if copper is used under the same conditions, the value of L is up to 0.019, and the aspect ratio is up to 10.3.

In short, the design of polarizing glass containing dispersed fine metal particles has heretofore been carried out based on Expression (3). For example, if polarizing glass that works at a light wavelength of 1.55 µm is to be produced, then the manufacturing process conditions have been determined such that the aspect ratios of fine metal particles, such as silver or copper, dispersed in the glass serving as a base material are distributed with respect to the above-described desired value.

On the other hand, as a result of intensive efforts to systematically study the relationship among the production type of fine metal particles produced by reducing stretched metal halide fine particles, extinction ratios, and light transmission spectrum, the inventors of the present invention have found the following relationship among them.

FIG. 15 shows polarizing glass containing dispersed fine metal particles produced by applying the present invention, as observed with a transmission electron microscope. Black, granular parts indicate fine metal particles, whereas regions including fine metal particles and white parts (non-metal fine particles) indicate regions in which metal halide fine particles were present before reduction treatment was carried out, that is, tracks of substantially needle-like metal halide fine particles.

According to the present invention, polarizing glass containing dispersed fine metal particles is produced through the following processes, subsequent to the dissolution process of glass serving as a base material.

(1) Precipitation process of metal halide fine particles (heat treatment at 680 to 750° C.)
↓ (cooled)
(2) Glass stretching process (heating and stretching treatment at 550 to 680° C.)
↓ (cooled)
(3) Reduction process (production of fine metal particles) (heat treatment in a reducing atmosphere at 300 to 450° C.)

Metal halide is reduced to metal through the reduction process. Because the molar volume of metal halide is several times larger than the molar volume of metal, the volume of metal produced by reduction is smaller than the volume of metal halide (refer to Table 2 below).

A case in which the metal halide is CuCl will be described, assuming that the treatment temperatures in the processes are as follows and that the glass transition-point temperature Tg of the glass substrate is 480° C.

Temperature in precipitation process of CuCl fine particles: 700° C.
Temperature in glass stretching process: 650° C.
Temperature in reduction process: 440° C.

The state of CuCl and the structure of the glass substrate in each of the processes are shown in Table 1.

TABLE 1

|  |  | State of CuCl | Structure of glass substrate |  |
|---|---|---|---|---|
| <1> Precipitation process of CuCl fine particles |  |  |  |  |
| Heating | Room temperature ↓ Tg 500° C. ↓ | Cu does not exist as CuCl | Frozen |  |
|  | CuCl precipitation temperature of 700° C. maintained for several hours | Liquid | Soft |  |
| Cooling | ↓ Tg 480° C. ↓ | Liquid | Frozen | → Within this temperature range, the volume of CuCl occupying in the glass substrate is determined. |
|  | CuCl melting point of 430° C. ↓ Room temperature | Solid |  |  |
| <2> Glass stretching process |  |  |  |  |
| Heating | Room temperature ↓ | Solid | Frozen |  |
|  | CuCl melting point of 430° C. ↓ Tg 480° C. ↓ | Liquid |  |  |
|  | Stretching temperature of 650° C. |  | Soft |  |
| Cooling | ↓ Tg 480° C. ↓ |  | Frozen |  |
|  | CuCl melting point of 430° C. ↓ Room temperature | Solid |  |  |
| <3> Reduction process |  |  |  |  |
| Heating | Room temperature ↓ | Solid | Frozen |  |
|  | CuCl melting point of 430° C. ↓ | Liquid |  |  |
|  | Reduction temperature of 440° C. | Reduction to Cu |  |  |
| Cooling | ↓ Room temperature | Cu (solid) |  |  |

(1) In the precipitation process of CuCl fine particles, Cl ions and Cu ions in the glass substrate coagulate to precipitate liquid CuCl fine particles by precipitation treatment at a maintained temperature of 700° C. When the glass temperature decreases to close to Tg, 480° C., in the cooling process, the glass structure freezes and becomes resistant to deformation. Because this temperature range is higher than the CuCl melting point of 430° C. (refer to Table 2 below), CuCl still exists in the liquid phase. However, because the glass structure freezes, the regions occupied by liquid CuCl are also solidified. When the glass temperature continues to decrease below the CuCl melting point, CuCl undergoes a phase change from liquid to solid. Because the density of liquid CuCl at 480° C. is 3.65 g/cm$^3$ (Metal Data Book, edited by the Japan Institute of Metals, Maruzen) and the density of solid CuCl is 4.14 g/cm$^3$ (Table 2), solid CuCl accounts for 88.2 volume % (3.65 g/cm$^3$ divided by 4.14 g/cm$^3$) in each region in which liquid CuCl was present. A volume difference of 11.8% resulting from the phase change becomes a void in each region in which liquid CuCl was present.

(2) Because the glass stretching process involves almost the same thermal history as that in the above-described CuCl precipitation process, the percentage of substantially needle-like solid CuCl cooled after the stretching process relative to each region in which CuCl fine particles were present is almost same as in (1).

(3) Because the reduction treatment is carried out at a temperature lower than Tg of glass, CuCl is reduced to Cu with the glass structure being frozen. Because the molar volume of CuCl is 23.9 cm$^3$/mol and the molar volume of Cu is 7.09 cm$^3$/mol (Table 2), the volume of the Cu fine metal particles to be produced is 29.7 volume % (7.09 cm$^3$/mol divided by 23.9 cm$^3$/mol) of the volume of solid CuCl, and 26.2 volume % (88.2 volume %×29.7 volume %) of the volume of CuCl that was present when the glass was frozen.

As a result of being influenced by the type of metal halide, the glass cooling rate, the thermal expansion of glass and metal halide, and so forth, the volume percentage of fine metal particles relative to a region occupying a metal halide fine particle is about 15 to 40 volume %, when calculated as described above.

The production type of the produced fine metal particles is classified as shown in FIG. 1.

FIG. 1 schematically shows the production types of substantially needle-like fine metal particles in polarizing glass containing dispersed fine metal particles, as observed with a transmission electron microscope. The mode in which a plurality of fine metal particles produced by reducing substantially needle-like metal halide are present in tracks, indicating the pre-existence of substantially needle-like metal halide, can be compared to a seed such as a garden pea or a marrow bean. A track indicating the pre-existence of substantially needle-like metal halide corresponds to the seedpod of a seed of a garden pea or a marrow bean, and a plurality of produced fine metal particles correspond to beans in the seed.

In FIG. 1, reference numeral 11 denotes tracks indicating the pre-existence of stretched metal halide fine particles, and reference numeral 12 denotes fine metal particles produced by reducing the metal halide fine particles. Furthermore, FIG. 1(a) schematically shows a mode in which one fine metal particle is produced from one metal halide fine particle, FIG. 1(b) two fine metal particles from one metal halide fine particle, and FIG. 1(c) three fine metal particles from one metal halide fine particle. In any case, because the molar volume of a metal halide fine particle is larger than that of metal, the percentage of the volume of the fine metal particle (total volume in FIGS. 1(b) and 1(c)) relative to the volume of the metal halide fine particle (hereinafter, this percentage is referred to as the "metal filling factor") is smaller than 1, as described above.

Table 2 lists physical properties of copper, silver, and their halides.

TABLE 2

Physical properties of copper, silver, and their halides

| | Metal | | | | Halide | | | |
|---|---|---|---|---|---|---|---|---|
| | Atomic weight [g/mol] | Density [g/cm$^3$] | Molar volume* [cm$^3$/mol] | Melting point [° C.] | | Atomic weight [g/mol] | Density [g/cm$^3$] | Molar volume* [cm$^3$/mol] | Melting point [° C.] |
| Cu | 63.546 | 8.96 | 7.09 | 1084.62 | CuCl | 98.999 | 4.14 | 23.9 | 430 |
| | | | | | CuBr | 143.450 | 4.98 | 28.8 | 497 |
| | | | | | CuI | 190.450 | 5.67 | 33.6 | 606 |
| Ag | 107.868 | 10.5 | 10.3 | 961.78 | AgCl | 143.321 | 5.56 | 25.8 | 455 |
| | | | | | AgBr | 187.772 | 6.47 | 29.0 | 432 |
| | | | | | AgI | 234.772 | 5.68 | 41.3 | 558 |

Atomic weights, formula weights, densities, and melting points are quoted from CRC Handbook of Chemistry and Physics 79th EDITION.
*Molar volumes are calculated from atomic weights or formula weights and densities.

In addition, if the center of the aspect ratio distribution of fine metal particles falls within a range from 8 to 9 in the production type shown in FIG. 1(a), the center of the distribution shifts towards a range of smaller numbers according to the number of produced fine metal particles, such as towards a range from 4 to 6 in the mode shown in FIG. 1(b) and towards a range from 2 to 3 in the case of FIG. 1(c) (hereinafter, the aspect ratio refers to a value $a_n/b_n$ obtained by dividing the size of a fine metal particle in a direction parallel to the lengthwise direction of a stretched metal halide fine particle ($a_n$, n=1 to 6 in FIGS. 1(a) to 1(c)) by the size of the fine metal particle in a direction parallel to the crosswise direction ($b_n$, n=1 to 6 in FIGS. 1(a) to (c))).

Furthermore, for polarizing glass containing dispersed fine metal particles in which the same number of fine metal particles of the same volume as in the present invention are produced in the production type shown in FIG. 1(a), fine metal particles are dispersed randomly in the glass substrate. For polarizing glass containing dispersed fine metal particles produced according to the present invention, on the other hand, fine metal particles are dispersed in the glass substrate in a certain regular pattern because the sites in the glass substrate at which fine metal particles exist are constrained by the shapes of substantially needle-like metal halide fine particles from which the fine metal particles originate.

Although the physical mechanism for this phenomenon is unknown, this experimental fact demonstrates that when a plurality of fine metal particles are produced by reduction from a single substantially needle-like metal halide fine particle, as shown in FIG. 1, the impact of the aspect ratios of these fine metal particles upon the light transmission characteristics is very minor compared with the impact estimated based on Expression (3). In other words, this experimental fact may suggest that if the aspect ratios of the fine metal particles fall within a particular range, the light transmittance and transmission spectrum are determined almost uniquely, irrespective of the magnitudes of the aspect ratios.

Furthermore, because the intensity of scattered light based on re-emission from fine metal particles is proportional to the square of their volumes in a state in which the influence of the aspect ratios upon the transmission characteristics is minor, in other words, in a state in which the absorption efficiency of fine metal particles is assured of a certain value irrespective of the aspect ratios, the intensity of scattered light can be decreased by decreasing the volumes of fine metal particles themselves. In the above-described FIGS. 1(a), 1(b), and 1(c), it is assumed that the volumes of the tracks 11 indicating the pre-existence of stretched metal halide fine particles are the same and that the sums of the volumes of the fine metal particles 12 produced by reducing the stretched metal halide fine particles are the same for FIGS. 1(a), 1(b), and 1(c). Furthermore, it is assumed that the volume (assigned to 1) of one fine metal particle 12 in FIG. 1(a) is divided into two in equal proportions for FIG. 1(b) and divided into three in equal proportions for FIG. 1(c).

Under this assumption, because the intensity of scattered light based on re-emission from a fine metal particle is proportional to the square of the volume of the fine metal particle as described above, the intensity of scattered light decreases as $2 \times (1/2)^2 = 0.5$ in FIG. 1(b) and $3 \times (1/3)^2 = 0.33$ in FIG. 1(c), if the intensity of scattered light in FIG. 1(a) is assigned to 1.

From the above descriptions, a dramatic improvement in near-field extinction ratio in the production types of fine metal particles shown in FIGS. 1(b) and 1(c) is attributable probably to the decrease in volume as a result of the fine metal particle being divided. In the present invention, even if numerous fine metal particles are to be produced from one metal halide fine particle after reduction, an extremely large volume of the metal halide fine particle before reduction will cause the volumes of individual fine metal particles to become large, weakening the effect of a decrease in volume as a result of fine metal particles being divided.

As a result of a systematic study, the inventors of the present invention have found that the effect of a fine metal particle being divided as shown in FIGS. 1(b) and 1(c) is brought about if the number of metal halide fine particles with volumes of 2,500 to 2,500,000 $nm^3$ accounts for 90% or more of the total number of metal halide fine particles, thereby increasing near-field (measurement distance of 15 mm) extinction ratios to 42 dB or more.

Volumes of metal halide fine particles of lower than 2,500 $nm^3$ are so small that the required aspect ratios of metal halide fine particles after heating and stretching treatment cannot be achieved, and therefore, satisfactory extinction ratio characteristics are almost never achieved.

Here, in the present invention and this specification, the volumes of metal halide fine particles, the volumes of regions occupied by metal halide fine particles before reduction, and the volumes of fine metal particles and the like are calculated by the following calculation method.

In short, substantially spheroidal halide fine particles precipitated by heat-treating the glass base material are deformed into a substantially needle-like shape as a result of the glass being stretched in the subsequent stretching process. From this, the shapes of substantially needle-like fine halide particles present in the glass substrate can be regarded as composed of circular cones and cylinders.

From this, the volume of the track of a halide fine particle present in the glass substrate is calculated assuming that the track is composed of a circular cone and a cylinder.

A triangle and a rectangle are applied to the track of a halide fine particle shown in an image taken with a transmission electron microscope, so that the volume of the circular cone portion is calculated assuming that the portion is a circular cone with a bottom surface whose diameter is equivalent to the base of the above-described triangle and with a height equivalent to the height of the same triangle. On the other hand, the volume of the cylinder portion is calculated assuming that the portion is a cylinder with a bottom surface equivalent to a circle whose diameter is the crosswise dimension of the track of the above-described rectangular halide fine particle and with a height equivalent to the lengthwise dimension of the track.

The volume of the track of the substantially needle-like fine halide particle is obtained by adding the calculated volumes of the circular cone and the cylinder. The volume of a fine metal particle to be produced by reduction treatment of a substantially needle-like fine halide particle is also calculated assuming that the fine metal particle is composed of a circular cone and a cylinder, as in the case of the volume of the track of a substantially needle-like fine halide particle.

In addition, if the metal filling factor, as calculated by dividing the volume of a fine metal particle or the sum of the volumes of a plurality of fine metal particles produced from a single metal halide fine particle by the volume of the metal halide fine particle, is over 40%, then the reduction of the metal halide fine particle is presumed to be insufficient. Such a phenomenon probably reflects a post-reduction state in which metal halide fine particles during reduction treatment are present, intermixed with metal produced by reduction, and will appear as shades of gray on an image taken with a transmission electron microscope. In such a case, the volumes of metal halide fine particles, which in fact should become smaller as a result of reduction, remain the same also after reduction, and the reduced fine metal particles and the metal halide fine particles during reduction treatment will work together to increase in volume in the form of a unified metal body. Because this unified metal body responds to incident light, the increased volume causes intense scattered light resulting from re-emission. Furthermore, because a fine metal particle is not often divided into two or more in such a unified metal body state, the effect of enhancing the near-field extinction ratios as a result of fine metal particles according to the present invention being divided to decrease the intensity of scattered light cannot be expected (even in a post-reduction state in which metal halide fine particles during reduction treatment are present, due to insufficient reduction of the metal halide fine particles, mixed with metal produced by reduction to form a unified metal body, as described above, the value obtained by dividing the sum of the volumes of portions which appear as shades of gray on an image taken with a transmission electron microscope by the volume of the metal halide fine particle from which the black portions originate is referred to as the metal filling factor). For a metal filling factor of less than 4%, it is presumed that a reduction reaction does not take place or is quite premature because of some insufficient reduction conditions, such as temperature or reducing atmosphere, preventing satisfactory extinction ratio characteristics from being achieved.

Therefore, a preferable range of metal filling factor according to the present invention is 4 to 40%. On an image taken with a transmission electron microscope, shades of gray can also be seen at metal portions, depending on the manner in which the image is taken. Thus, it is preferable that the number of metal halide fine particles with a metal filling factor of 4 to 40% account for 90% or more of the total number of metal halide fine particles.

In a case where three fine metal particles are produced from one metal halide fine particle according to the present invention, the intensity of scattered light decreases, compared with a case in which two fine metal particles are produced, because of more divisions, enhancing the near-field extinction ratios. Furthermore, it has been confirmed that if the number of metal halide fine particles resulting in three or more fine metal particles accounts for 20% or more of the total number of metal halide fine particles, the near-field extinction ratio is prominently enhanced. The near-field extinction ratio of polarizing glass with a structure in this mode is generally 45 dB or more.

It is needless to say that the above-described effect afforded by producing a plurality of fine metal particles from one stretched metal halide fine particles via reduction is not limited to the cases in which the number of produced fine metal particles is two or three, as shown in FIG. 1. This effect is also afforded in a case where more than three fine metal particles are produced.

In addition, the volumes of individual fine metal particles produced by reduction are preferably minimized. As a result of a systematic study, the inventors of the present invention have found that the effect of decreasing scattered light as a result of a fine metal particle being divided according to the present invention is readily brought about if the number of fine metal particles with a volume of 100,000 nm$^3$ or less accounts for 90% or more of the total number of fine metal particles.

In polarizing glass having near-field extinction ratios enhanced as a result of a fine metal particle being divided, as characterized by the present invention, the aspect ratios of fine metal particles exhibit relatively small numbers as a result of metal division. In Expression (3), which has been regarded as describing light absorption of polarizing glass, if the aspect ratio of the fine metal particle is, for example, 2 or less, light absorption almost never takes place in a wavelength band of 1.31 μm or 1.55 μm, which are the wavelength bands used for optical communication. According to the present invention, however, in the type in which three fine metal particles are produced from one metal halide fine particle, fine metal particles with an aspect ratio of 2 or less are included. Furthermore, in a case where a fine metal particle is divided into five to ten particles, most of the fine metal particles have an aspect ratio of 2 or less.

In addition, although it is expected from Expression (3) that the aspect ratios of fine metal particles are in a normal distribution around 11 as described above, fine metal particles with an aspect ratio of 9 or less account for 90% or more of all fine metal particles in the mode in which three fine metal particles are produced from one metal halide fine particle.

The near-field extinction ratios of polarizing glass were as high as 42 dB or more in all of the three cases described above, and a practical isolation level of 31 dB or more was achieved even when the glass was incorporated in a pigtail isolator.

Numerical calculations, such as for the volumes and metal filling factors of metal halide fine particles, the number and the proportion of fine metal particles produced from one metal halide fine particle, the volumes of fine metal particles, and aspect ratios of fine metal particles, can be carried out with high accuracy by analyzing about 50 metal halide fine particles on an image taken with a transmission electron microscope.

The present invention will now be described in detail via Examples.

COMPARATIVE EXAMPLE

Glass with a composition of $SiO_2$: 57.5 wt %, $B_2O_3$: 19.5 wt %, $Al_2O_3$: 8.9 wt %, $AlF_3$: 2.0 wt %, $Na_2O$: 9.8 wt %, NaCl: 1.4 wt %, CuCl: 0.8 wt %, and SnO: 0.1 wt % was produced by placing $SiO_2$, $H_3BO_3$, $Al(OH)_3$, $Na_2CO_3$, NaCl, $AlF_3$, CuCl, and SnO as raw materials in a 3-liter platinum crucible, dissolving them at about 1450° C., pouring them into a graphite die for molding, and then cooling them to room temperature.

This glass was heat-treated for six hours at 700° C. to precipitate CuCl fine particles. This glass was cut into a 5×50×100 mm size to form a preform. The preform was heated and stretched at about 600° C. to produce a glass film with a thickness of about 0.7 mm.

Observation of the produced glass film with a transmission electron microscope revealed that numerous substantially needle-like metal halide fine particles were oriented and dispersed such that the lengthwise directions thereof were almost the same.

The relevant glass film was reduced to a thickness of 0.3 mm by mechanical polishing and then heat-treated in a hydrogen atmosphere at 440° C. for about seven hours to reduce needle-likely stretched CuCl fine particles to metal copper, thus producing polarizing glass containing dispersed fine metal particles.

Observation of the produced polarizing glass containing dispersed fine metal particles with a transmission electron microscope revealed that tracks indicating the pre-existence of substantially needle-like metal halide fine particles before the reduction treatment remained in the same orientation and dispersion state also after the reduction treatment, more specifically, oriented and dispersed such that the lengthwise directions thereof were almost the same.

In addition, the number of CuCl fine particles with a volume of 2,500 to 2,500,000 nm$^3$ accounted for 86% of the total number of precipitated CuCl fine particles, as calculated based on tracks indicating the pre-existence of CuCl fine particles before the reduction treatment.

Furthermore, all production types of fine copper particles were as schematically shown in FIG. 1(a). A production type, as schematically shown in FIG. 1(b), in which two fine copper particles are produced from one stretched CuCl fine particle was not noticed. In addition, the percentage of fine copper particles with a metal filling factor of 4 to 40% was 67%, and the number of fine copper particles with a volume of 100,000 nm$^3$ or less accounted for 85% of the total number of produced fine copper particles. The reduction layer thickness achieved at this time was about 35 μm.

FIG. 8 shows an aspect ratio distribution of needle-like fine copper particles that were observed with a transmission electron microscope. No fine copper particles with an aspect ratio of less than 2 were found. In addition, the average aspect ratio of fine metal particles was 7.9.

In FIG. 8, reference numeral 81 denotes an aspect ratio distribution of needle-like fine copper particles, and reference numeral 82 denotes an approximate distribution curve of the aspect ratio distribution 81, given based on Expression (6) below. The number of parameters when the aspect ratio distribution 81 of needle-like fine copper particles was obtained was about 200.

[Expression 6]

$$\Omega(x) = 20 \times \exp\left[-\frac{(x-8.4)^2}{2 \cdot (1.4)^2}\right] \quad (6)$$

Here, x represents the aspect ratio.

When the extinction ratio of the polarizing glass containing dispersed fine metal particles produced by the above-described method was measured by the measuring system shown in FIG. 12, the extinction ratio was 37 dB with a measurement wavelength of 1.55 μm at a distance (L) of 15 mm. In addition, a pigtail optical isolator as shown in FIG. 14 was manufactured using glass containing dispersed fine metal particles according to this Example to measure the isolation. The result was 27 dB, lower by 3 dB than the target isolation level of 30 dB. The extinction ratio and other obtained results are summarized in Table 3 below.

FIG. 9 shows a comparison between an actually measured transmission spectrum for a linearly polarized wave having an electric-field oscillation direction equivalent to a direction parallel to the lengthwise directions of stretched CuCl fine particles and a transmission spectrum calculated using Expressions (3) to (6) based on the aspect ratio distribution shown in FIG. 8. In the figure, reference numeral 91 denotes the calculated transmission spectrum, and reference numeral 92 denotes the actually measured transmission spectrum. Actual measurement of transmission spectrum was carried out with a spectroscope. Because the spectroscope used cannot measure a transmittance of 1% or less, FIG. 9 does not show actual transmittance measurements for a 950 to 1730 nm wavelength region exhibiting a transmittance of 1% or less.

For calculation, the shape factor L was calculated using the following Expression (7) (refer to, for example, R. Becker, Electromagnetic Fields and Interactions, Blaisdell (1961), 102-107), assuming that the volumes of fine copper particles are constant, using Expression (6) for Ω(S.F.) in Expression (5), and assuming that the fine copper particles are a cigar-shaped spheroid.

[Expression 7]

$$L = \frac{1}{x^2-1}\left[\frac{x}{\sqrt{x^2-1}}\ln(x+\sqrt{x^2-1}-1)\right] \quad (7)$$

Furthermore, although the product of N and the normalization factor of the distribution function Ω(S.F.) (or Ω(x)) in Expression (5) is required for calculation of the transmission spectrum, this product was obtained assuming that the actually measured transmittance at a wavelength of 2000 nm coincides with the calculated transmittance.

As shown in FIG. 9, although a minor difference can be seen between the actually measured transmission spectrum and the calculated transmission spectrum on the short-wavelength side at a wavelength of 1000 nm or less, both spectra are in good agreement on the long-wavelength side at a wavelength of 1700 nm or more.

The expression "the shape of a theoretically obtained transmittance spectrum" appearing in the Claims means the shape of the transmittance spectrum obtained by the above-described method from actual measurements of aspect ratios of fine metal particles.

EXAMPLE 1

In this Example, polarizing glass containing dispersed fine metal particles was produced using glass with a composition of $SiO_2$: 56.0 wt %, $B_2O_3$: 17.5 wt %, $Al_2O_3$: 6.0 wt %, $AlF_3$: 4.0 wt %, $Na_2O$: 10.0 wt %, NaCl: 2.0 wt %, CuCl: 1.2 wt %, and SnO: 0.3 wt %. The other conditions, such as the method of melting the glass, were the same as for the Comparative Example in producing the polarizing glass containing dispersed fine metal particles. For this polarizing glass containing dispersed fine metal particles, numerous tracks occupied by individual CuCl fine particles before reduction treatment were oriented and dispersed such that the lengthwise directions thereof were almost the same, and fine copper particles were produced in these tracks.

In more detail, observation of the produced polarizing glass containing dispersed fine metal particles with a transmission electron microscope confirmed that two fine copper particles were produced from one CuCl fine particle before the reduction treatment, as schematically shown in FIG. 1(b), in about 18% of the total number of the numerous tracks occupied by individual CuCl fine particles before the reduction treatment (the number of observations in this Example was about 200). Furthermore, about 82% of the observed tracks were in the production type in which one fine copper particle is produced from one CuCl fine particle before the reduction treatment, as shown in FIG. 1(a), whereas the production type in which three fine copper particles are produced from one CuCl fine particle before the reduction treatment, as shown in FIG. 1(c), was not confirmed in this Example.

In addition, as a result of calculating the volumes of these numerous tracks by the calculation method described in paragraph 0059 from an observed image obtained with a transmission electron microscope, about 90% or more of the observed tracks had a volume ranging from 2,500 to 2,500,000 $nm^3$.

Furthermore, the volume of one fine copper particle or the sum of the volumes of two fine copper particles produced in each of these numerous tracks ranged from 4 to 40% of the volume of the track in about 90% or more of those tracks. In addition, for about 90% or more of the individual copper particles, the volumes of the particles were confirmed to range below 100,000 $nm^3$.

FIG. 2 shows an aspect ratio distribution of needle-like fine copper particles that were observed with a transmission electron microscope. The percentage of fine copper particles with aspect ratios of fine metal particles of less than 2 was 17% relative to the total number of fine copper particles produced, and the average aspect ratio of fine metal particles was 4.1.

In FIG. 2, reference numeral 21 denotes an aspect ratio distribution of needle-like fine copper particles, and reference numeral 22 denotes an approximate distribution curve of the aspect ratio distribution 21, given using Expression (8) below. The number of parameters when the aspect ratio distribution 21 of needle-like fine copper particles was obtained was about 200.

[Expression 8]

$$\Omega(x) = -0.0049x^6 + 0.1481x^5 - 1.7248x^4 + 9.8639x^3 - 30.207x^2 + 51.227x - 27.316 \quad (8)$$

As a result of measuring the extinction ratio of the polarizing glass containing dispersed fine metal particles according to this Example using the measuring system shown in FIG. 12, the extinction ratio was 42 dB with a measurement wavelength of 1.55 μm at a distance (L) of 15 mm. Furthermore, a pigtail optical isolator was manufactured using the glass containing dispersed fine metal particles according to this Example, as in the Comparative Example, and the isolation was measured. The result was 31 dB, higher than the target level of 30 dB.

The extinction ratio and other obtained results are summarized in Table 3.

FIG. 3 shows a comparison between a transmission spectrum calculated from the aspect ratio distribution shown in FIG. 2 in the same manner as in the Comparative Example and an actually measured spectrum. In the figure, reference numeral 31 denotes a transmission spectrum obtained by calculation, and reference numeral 32 denotes an actually measured spectrum. For calculation, the product of N and the normalization factor of the distribution function in Expression (5) was obtained assuming that the actually measured transmittance at a wavelength of 800 nm coincides with the calculated transmittance.

As shown in FIG. 3, the actually measured transmission spectrum greatly differs from the calculated spectrum, compared with the Comparative Example, and the shape of the calculated transmission spectrum is enlarged towards the long-wavelength side, in other words, the region in which the transmittance is about 1% or less reaches the long-wavelength region. At least over the band of 500 to 2500 nm for which this measurement was carried out, the transmittance of the polarizing glass according to this Example was 50% or less.

EXAMPLE 2

In this Example, polarizing glass containing dispersed fine metal particles was produced in the same manner as in Example 1 (i.e., by the method described in the Comparative Example), except for the following points. More specifically, in this Example, the thickness of the preform was 2 mm, and this preform was stretched to produce a glass film with a thickness of 0.25 mm. Thereafter, without thinning it by mechanical polishing, reduction treatment was carried out under the conditions described in Example 1 (same as in the Comparative Example).

For this polarizing glass containing dispersed fine metal particles, numerous tracks occupied by individual CuCl fine particles before reduction treatment were oriented and dispersed such that the lengthwise directions thereof were almost the same, and fine copper particles were produced in the numerous tracks.

In more detail, observation of the produced polarizing glass containing dispersed fine metal particles with a transmission electron microscope confirmed that two fine copper particles were produced from one CuCl fine particle before the reduction treatment, as schematically shown in FIG. 1(b), in about 48% of the total number of the numerous tracks occupied by individual CuCl fine particles before the reduction treatment (the number of observations in this Example was about 300). Furthermore, it was also confirmed that about 20% of the tracks were in the production type in which three or more fine copper particles are produced from one CuCl fine particle before the reduction treatment, as shown in FIG. 1(c). The production type in which one fine copper particle is produced from one CuCl fine particle before the reduction treatment, as shown in FIG. 1(a), was confirmed in about 32% of the tracks.

In addition, as a result of calculating the volumes of these numerous tracks by the calculation method described in paragraph 0059 from an observed image obtained with a transmission electron microscope, about 93% of the observed tracks had a volume ranging from 2,500 to 2,500,000 $nm^3$.

Furthermore, it was confirmed that the volume of one fine copper particle or the sum of the volumes of two or three or more fine copper particles produced in each of these numerous tracks ranged from 4 to 40% of the volume of the track in about 99% of those tracks. In addition, for about 96% of the individual copper particles, the volumes of the particles were confirmed to range below 100,000 $nm^3$.

FIG. 4 shows an aspect ratio distribution of needle-like fine copper particles that were observed with a transmission electron microscope. The percentage of fine copper particles with aspect ratios of fine metal particles of less than 2 was 53% relative to the total number of produced fine copper particles, and the average aspect ratio of fine metal particles was 2.5.

In FIG. 4, reference numeral 41 denotes an aspect ratio distribution of needle-like fine copper particles, and reference numeral 42 denotes an approximate distribution curve of the aspect ratio distribution 41, given using Expression (9) below. The number of parameters when the aspect ratio distribution 41 of needle-like fine copper particles was obtained was about 300.

[Expression 9]

$$\Omega(x)=0.0017x^6-0.0712x^5+1.1967x^4-10.03x^3+44.048x^2-99.833x+110.99 \quad (9)$$

As a result of measuring the extinction ratio of the polarizing glass containing dispersed fine metal particles according to this Example using the measuring system shown in FIG. 12, the extinction ratio was 45 dB with a measurement wavelength of 1.55 at a distance (L) of 15 mm.

Furthermore, a pigtail optical isolator was manufactured using the glass containing dispersed fine metal particles according to this Example, and the isolation was measured. The result was 32 dB, higher than the target level of 30 dB.

The extinction ratio and other obtained results are summarized in Table 3.

FIG. 5 shows a comparison between a transmission spectrum calculated from the aspect ratio distribution shown in FIG. 4 in the same manner as in the Comparative Example and an actually measured spectrum. In the figure, reference numeral 51 denotes a transmission spectrum obtained by calculation, and reference numeral 52 denotes an actually measured spectrum. For calculation, the product of N and the normalization factor of the distribution function in Expression (5) was obtained assuming that the actually measured transmittance at a wavelength of 800 nm coincides with the calculated transmittance.

As shown in FIG. 5, the actually measured transmission spectrum greatly differs from the calculated spectrum, compared with the Comparative Example, and the shape of the calculated transmission spectrum is enlarged towards the long-wavelength side, in other words, the region in which the transmittance is about 1% or less reaches the long-wavelength region. At least over the band of 500 to 2600 nm for which this measurement was carried out, the transmittance of the polarizing glass according to this Example was 50% or less.

EXAMPLE 3

In this Example, polarizing glass containing dispersed fine metal particles was produced in the same manner as in Example 1 (i.e., by the method described in the Comparative Example), except for the following points. More specifically, in this Example, reduction treatment was carried out under the following conditions: hydrogen atmosphere pressure of 100 atm, treatment temperature of 355° C., and processing time of 30 minutes.

For this polarizing glass containing dispersed fine metal particles, numerous tracks occupied by individual CuCl fine particles before reduction treatment were oriented and dispersed such that the lengthwise directions thereof were almost the same, and fine copper particles were produced in the numerous tracks.

In more detail, observation of the produced polarizing glass containing dispersed fine metal particles with a transmission electron microscope confirmed that three or more fine copper particles were produced from one CuCl fine particle before the reduction treatment, as schematically shown in FIG. 1(c), in about 92% of the total number of the numerous tracks occupied by individual CuCl fine particles before the reduction treatment (the number of observations in this Example was about 300). Furthermore, it was also confirmed that about 6% of the tracks were in the production type in which two fine copper particles are produced from one CuCl fine particle before the reduction treatment, as shown in FIG. 1(b). The production type in which one fine copper particle is produced from one CuCl fine particle before the reduction treatment, as shown in FIG. 1(a), was confirmed in about 2% of the tracks.

In addition, as a result of calculating the volumes of these numerous tracks by the calculation method described in paragraph 0059 from an observed image obtained with a transmission electron microscope, about 97% of the observed tracks had a volume ranging from 2,500 to 2,500,000 $nm^3$.

Furthermore, it was confirmed that the volume of one fine copper particle or the sum of the volumes of two or three or more fine copper particles produced in each of these numerous tracks ranged from 4 to 40% of the volume of the track in about 100% of those tracks. In addition, for about 99% of the individual copper particles, the volumes of the particles were confirmed to range below 100,000 $nm^3$.

FIG. 6 shows an aspect ratio distribution of needle-like fine copper particles that were observed with a transmission electron microscope. The percentage of fine copper particles with aspect ratios of fine metal particles of less than 2 was 83% relative to the total number of produced fine copper particles, and the average aspect ratio of fine metal particles was 1.4.

In FIG. 6, reference numeral 61 denotes an aspect ratio distribution of needle-like fine copper particles, and reference numeral 62 denotes an approximate distribution curve of the aspect ratio distribution 61, given using Expression (10) below. The number of parameters when the aspect ratio distribution 61 of needle-like fine copper particles was obtained was about 300.

[Expression 10]

$$\Omega(x) = 0.0051x^6 - 0.1763x^5 + 2.3971x^4 - 16.692x^3 + 65.342x^2 + 150.98x + 183.93 \quad (10)$$

As a result of measuring the extinction ratio of the polarizing glass containing dispersed fine metal particles according to this Example using the measuring system shown in FIG. 12, the extinction ratio was 47 dB with a measurement wavelength of 1.55 μm at a distance (L) of 15 mm.

Furthermore, a pigtail optical isolator was manufactured using the glass containing dispersed fine metal particles according to this Example, and isolation was measured. The result was 34 dB, higher than the target level of 30 dB.

The extinction ratio and other obtained results are summarized in Table 3.

Table 3 lists characteristics of polarizing elements produced according to Examples 1 to 3 and the Comparative Example.

TABLE 3

Characteristics of produced polarizing elements

|  | Example 1 | Example 2 | Example 3 | Comparative Example 1 |
|---|---|---|---|---|
| Percentage of tracks, occupied by metal halide fine particles, whose volumes are each 2,500 to 2,500,000 $nm^3$ | 90% | 93% | 97% | 86% |
| Presence of two or more fine metal particles and the percentage | Present (18%) | Present (68%) | Present (98%) | Not present |
| Presence of three or more fine metal particles and the percentage | Not present | Present (20%) | Present (92%) | Not present |
| Percentage of tracks with metal filling factor of 4 to 40% | 90% | 99% | 100% | 67% |
| Metal filling factor* | 40% | 28% | 22% | 52% |
| Percentage of fine metal particles whose volumes are each 100,000 $nm^3$ or less | 90% | 96% | 99% | 85% |
| Presence of fine metal particles with aspect ratio of less than 2 and the percentage | Present (17%) | Present (53%) | Present (83%) | Not present |
| Average aspect ratio of fine metal particles | 4.1 | 2.5 | 1.4 | 7.9 |
| Near-field extinction ratio (L = 15 mm) | 42 dB | 45 dB | 47 dB | 37 dB |
| Isolation of pigtail isolator and its applicability | 31 dB Applicable | 32 dB Applicable | 34 dB Applicable | 27 dB Not applicable |

*Metal filling factors were obtained by producing a histogram of metal filling factors of reduced metal halide fine particles, accumulating the frequencies of the metal filling factors starting with the frequency of the lowest metal filling factor, and then finding the metal filling factor at the frequency up to which the accumulated number is 90% of the total number of metal halide fine particles.

As is apparent from FIGS. 2, 4, and 6 showing the aspect ratio distributions of fine copper particles in the respective Examples, 90% or more of the fine copper particles produced by the reduction treatment described in Examples 1 to 3 according to the present invention have an aspect ratio of 9 or less.

All polarizing elements with these features exhibit high extinction ratios, as described above, and the theory explaining this effect is not necessarily clear. However, in a state in which the absorption efficiency of fine metal particles is assured of a certain constant value, even if the aspect ratios of fine metal particles are smaller than those expected from Expression (3), the volumes of fine metal particles decrease as a result of a plurality of fine metal particles being produced by reduction of metal halide fine particles. This is presumed to decrease re-radiated light, thus enhancing the near-field extinction ratio.

FIG. 7 shows a comparison between a transmission spectrum calculated from the aspect ratio distribution shown in FIG. 6 in the same manner as in the Comparative Example and an actually measured spectrum. In the figure, reference numeral 71 denotes a transmission spectrum obtained by calculation, and reference numeral 72 denotes an actually measured spectrum. In this Example, because the product of N and the normalization factor of the distribution function in Expression (5) cannot be obtained by combining the calculated transmittance and the actually measured transmittance, as in the Comparative Example or the above-described Examples, the calculated transmission spectrum is shown so as to give its minimum value of about 0.004%.

As shown in FIG. 7, the actually measured transmission spectrum greatly differs from the calculated spectrum, compared with the Comparative Example, and the shape of the calculated transmission spectrum is enlarged towards the long-wavelength side, in other words, the region in which the transmittance is about 1% or less reaches the long-wavelength region. At least over the band of 500 to 2600 nm for which this measurement was carried out, the transmittance of the polarizing glass according to this Example was 50% or less.

The present invention has been described in detail based on the Examples. The effects of the present invention are not specific to polarizing glass containing dispersed fine metal particles produced based on the methods and conditions described in the Examples. Instead, these effects can be seen in polarizing glass containing dispersed fine metal particles associated with the type in which a plurality of fine metal particles are produced from one metal halide fine particle. In this respect, the type of metal is not limited to copper. Instead, the same effect can be afforded with other metals, such as silver.

The polarizing glass containing dispersed fine particles according to the present invention can be applied to optical isolators employing polarizing glass, such as pigtail optical isolators, or to optical devices employing a polarizing element.

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A polarizing element, comprising:
   a glass substrate; and
   fine metal particles provided in a plurality of regions dispersed in the glass substrate;
   wherein:
   the fine metal particles are obtained by heat-treating the glass substrate in a reducing atmosphere to reduce substantially needle-shaped metal halide fine particles present in the glass substrate prior to the heat-treatment;
   prior to the heat-treatment the substantially needle-shaped metal halide fine particles are oriented and dispersed in the glass substrate so that lengthwise directions of the substantially needle-shaped metal halide fine particles are substantially the same;
   the plurality of regions in which the fine metal particles are provided correspond to regions occupied by the substantially needle-shaped metal halide fine particles prior to the heat-treatment;
   two or more fine metal particles are present in at least some of plurality of regions;
   90% or more of the plurality of regions have a volume of 2,500 to 2,500,000 nm$^3$; and
   90% or more of the plurality of regions include a fine metal particle having a volume of 4 to 40% of a volume of the region in which the particle is provided.

2. The polarizing element according claim 1, wherein three or more fine metal particles are present in at least some of the plurality of regions.

3. The polarizing element according to claim 2, wherein three or more fine metal particles are present in 20% or more of the plurality of regions.

4. The polarizing element according to any one of claims 1 to 3, wherein 90% or more of the fine metal particles have an individual volume of 100,000 nm$^3$ or less.

5. The polarizing element according to any one of claims 1 to 3, wherein:
   at least one of the fine metal particles has an aspect ratio of less than 2, and
   the aspect ratio is determined by dividing a size of the fine metal particle in a direction parallel to the lengthwise directions of the metal halide fine particles by a size of the fine metal particle in a direction parallel to minor axes of the metal halide fine particles.

6. The polarizing element according to any one of claims 1 to 3, wherein:
   90% or more of the fine metal particles have an aspect ratio of 9 or less;
   the aspect ratio is determined by dividing a size of the fine metal particle in a direction parallel to the lengthwise directions of the metal halide fine particles by a size of the fine metal particle in a direction parallel to minor axes of the metal halide fine particles.

7. The polarizing element according to any one of claims 1 to 3, wherein the polarizing element exhibits a near-field extinction ratio of 42 dB or more at a measurement distance L of 15 mm.

8. A polarizing element, comprising:
   a glass substrate; and
   fine metal particles provided in a plurality of regions dispersed in the glass substrate;
   wherein:
   the fine metal particles are obtained by heat-treating the glass substrate in a reducing atmosphere to reduce substantially needle-shaped metal halide fine particles present in the glass substrate prior to the heat-treatment;
   prior to the heat-treatment the substantially needle-shaped rectal halide fine particles are oriented and dispersed in the glass substrate so that lengthwise directions of the substantially needle-shaped metal halide fine particles are substantially the same;
   the plurality of regions in which the fine metal particles are provided correspond to regions occupied by the substantially needle-shaped metal halide fine particles prior to the heat-treatment;

two or more fine metal particles are present in at least some of the plurality of regions;

90% or more of the plurality of regions have a volume of 2,500 to 2,500,000 $nm^3$;

90% or more of the plurality of regions include a fine metal particle having a volume of 4 to 40% of a volume of the region in which the particle is provided; and a shape of a transmittance spectrum of the polarizing element for a linearly polarized wave having an electric-field oscillation direction in a direction substantially parallel to the lengthwise directions of the metal halide fine particles is enlarged towards a long-wavelength side, relative to a shape of a transmittance spectrum theoretically obtained from an aspect ratio distribution of fine metal particles produced by reducing the metal halide fine particles, each of the aspect ratios being determined by dividing a size of the fine metal particle in a direction parallel to the lengthwise directions of the metal halide fine particles by a size of the fine metal particle in a direction parallel to minor axes of the metal halide fine particles.

9. The polarizing element according to claim 8, wherein a wavelength bandwidth exhibiting a transmittance of about 1% in a transmittance spectrum of the polarizing element for a linearly polarized wave having an electric-field oscillation direction in a direction substantially parallel to the lengthwise directions of the metal halide fine particles is wider than a wavelength bandwidth exhibiting a transmittance of about 1% in a transmittance spectrum theoretically obtained from the aspect ratio distribution of fine metal particles.

10. The polarizing element according to one of claims 8 and 9, wherein, in a transmittance spectrum of the polarizing element for a linearly polarized wave having an electric-field oscillation direction in a direction substantially parallel to the lengthwise directions of the metal halide fine particles, the transmittance is about 50% or less at least in a band including light wavelengths of 400 nm to 2500 nm.

11. The polarizing element according to any one of claims 1 to 3, 8, and 9, wherein the metal halide fine particles comprise silver halide or copper halide.

* * * * *

UNITED STATES PATENT AND TRADEMARK OFFICE
CERTIFICATE OF CORRECTION

PATENT NO. : 8,144,398 B2
APPLICATION NO. : 13/017426
DATED : March 27, 2012
INVENTOR(S) : Yoshitaka Yoneda et al.

It is certified that error appears in the above-identified patent and that said Letters Patent is hereby corrected as shown below:

On the title page, Item (30), the Foreign Application Priority Data is omitted. Item (30) should read:

-- (30)    Foreign Application Priority Data

July 31, 2008    (JP) ............................. 2008-198021 --

Signed and Sealed this
Eighteenth Day of December, 2012

David J. Kappos
*Director of the United States Patent and Trademark Office*